US012602863B2

(12) United States Patent
Mandl et al.

(10) Patent No.: US 12,602,863 B2
(45) Date of Patent: Apr. 14, 2026

(54) HAND-BASED LIGHT ESTIMATION FOR EXTENDED REALITY

(71) Applicant: Snap Inc., Santa Monica, CA (US)

(72) Inventors: David Mandl, Graz (AT); Alexander Plopski, Graz (AT)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/604,321

(22) Filed: Mar. 13, 2024

(65) Prior Publication Data

US 2025/0292493 A1     Sep. 18, 2025

(51) Int. Cl.
| | |
|---|---|
| *G06F 3/01* | (2006.01) |
| *G06T 7/11* | (2017.01) |
| *G06T 7/73* | (2017.01) |
| *G06T 15/50* | (2011.01) |
| *G06T 19/00* | (2011.01) |
| *G06V 10/70* | (2022.01) |
| *G06V 10/82* | (2022.01) |
| *G06V 40/10* | (2022.01) |

(Continued)

(52) U.S. Cl.
CPC ............ *G06T 15/506* (2013.01); *G06F 3/011* (2013.01); *G06F 3/017* (2013.01); *G06T 7/11* (2017.01); *G06T 7/73* (2017.01); *G06T 19/00* (2013.01); *G06V 10/70* (2022.01); *G06V 10/82* (2022.01); *G06V 10/87* (2022.01); *G06V 40/11* (2022.01); *G06V 40/113* (2022.01); *G06V 40/28* (2022.01); *G06T 2207/20081* (2013.01); *G06T 2207/20084* (2013.01); *G06T 2207/30196* (2013.01); *G06V 10/774* (2022.01)

(58) Field of Classification Search
CPC .......... G06F 3/017; G06F 3/011; G06F 3/013; G06F 3/012; G06F 3/0304; G06F 3/014; G06F 3/04815; G06V 40/28; G06V 10/82; G06V 40/11; G06V 20/20; G06V 40/20; G06V 10/87; G06V 10/60; G06V 10/17; G06V 10/145; G06T 2207/20084; G06T 2207/20081; G06T 19/006; G06T 7/73; G06T 7/75
See application file for complete search history.

(56) References Cited

U.S. PATENT DOCUMENTS

| | | | | |
|---|---|---|---|---|
| 10,515,484 | B1 * | 12/2019 | Lucas | ..................... G06F 3/011 |
| 10,572,024 | B1 * | 2/2020 | Saba | ...................... G01S 15/88 |

(Continued)

OTHER PUBLICATIONS

"International Application Serial No. PCT US2025 019588, International Search Report mailed Jul. 10, 2025", 4 pgs.

(Continued)

*Primary Examiner* — Dismery Mercedes
(74) *Attorney, Agent, or Firm* — Schwegman Lundberg & Woessner, P.A.

(57) ABSTRACT

Examples described herein relate to hand-based light estimation for extended reality (XR). An image sensor of an XR device is used to obtain an image of a hand in a real-world environment. At least part of the image is processed to detect a pose of the hand. One of a plurality of machine learning models is selected based on the detected pose. At least part of the image is processed via the machine learning model to obtain estimated illumination parameter values associated with the hand. The estimated illumination parameter values are used to render virtual content to be presented by the XR device.

20 Claims, 10 Drawing Sheets

(51) Int. Cl.
   *G06V 40/20*     (2022.01)
   *G06V 10/774*    (2022.01)

(56)          References Cited

U.S. PATENT DOCUMENTS

| | | | | |
|---|---|---|---|---|
| 2017/0031453 | A1 | 2/2017 | Presura | |
| 2017/0168586 | A1* | 6/2017 | Sinha | G06N 20/00 |
| 2019/0102927 | A1* | 4/2019 | Yokokawa | G06F 3/017 |
| 2019/0138107 | A1* | 5/2019 | Nietfeld | A63F 13/428 |
| 2020/0409469 | A1* | 12/2020 | Kannan | G06F 18/214 |
| 2021/0074016 | A1* | 3/2021 | Li | G06T 7/73 |
| 2021/0201661 | A1* | 7/2021 | Al Jazaery | G06V 10/764 |
| 2022/0004750 | A1* | 1/2022 | Koo | G06V 40/103 |
| 2022/0198179 | A1* | 6/2022 | Guignard | G06T 19/20 |
| 2022/0405946 | A1* | 12/2022 | Ruan | G06V 10/141 |
| 2023/0081742 | A1* | 3/2023 | Unger | G06V 10/751 |
| | | | | 382/100 |
| 2023/0400911 | A1 | 12/2023 | Ye et al. | |
| 2024/0104961 | A1* | 3/2024 | Ang | G06V 40/28 |
| 2024/0220032 | A1* | 7/2024 | Amano | G06F 3/014 |
| 2024/0375011 | A1* | 11/2024 | Black | A63F 13/67 |

OTHER PUBLICATIONS

"International Application Serial No. PCT US2025 019588, Written Opinion mailed Jul. 10, 2025", 6 pgs.

Karthikeyan, C., "Certain Investigations on Hand Gesture Recognition Systems", 2023 International Conference on Emerging Research in Computational Science (ICERCS), IEEE, (Dec. 7, 2023), 8 pgs.

* cited by examiner

100

REAL-WORLD ENVIRONMENT

226

LIGHT ESTIMATION SYSTEM

302 — IMAGE PREPROCESSING COMPONENT

304 — POSE DETECTION COMPONENT

306 — MODEL SELECTION COMPONENT

308 — ILLUMINATION ESTIMATION COMPONENT

310 — RENDERING COMPONENT

312 — USER INTERACTION COMPONENT 950    904    900

Figure 9:
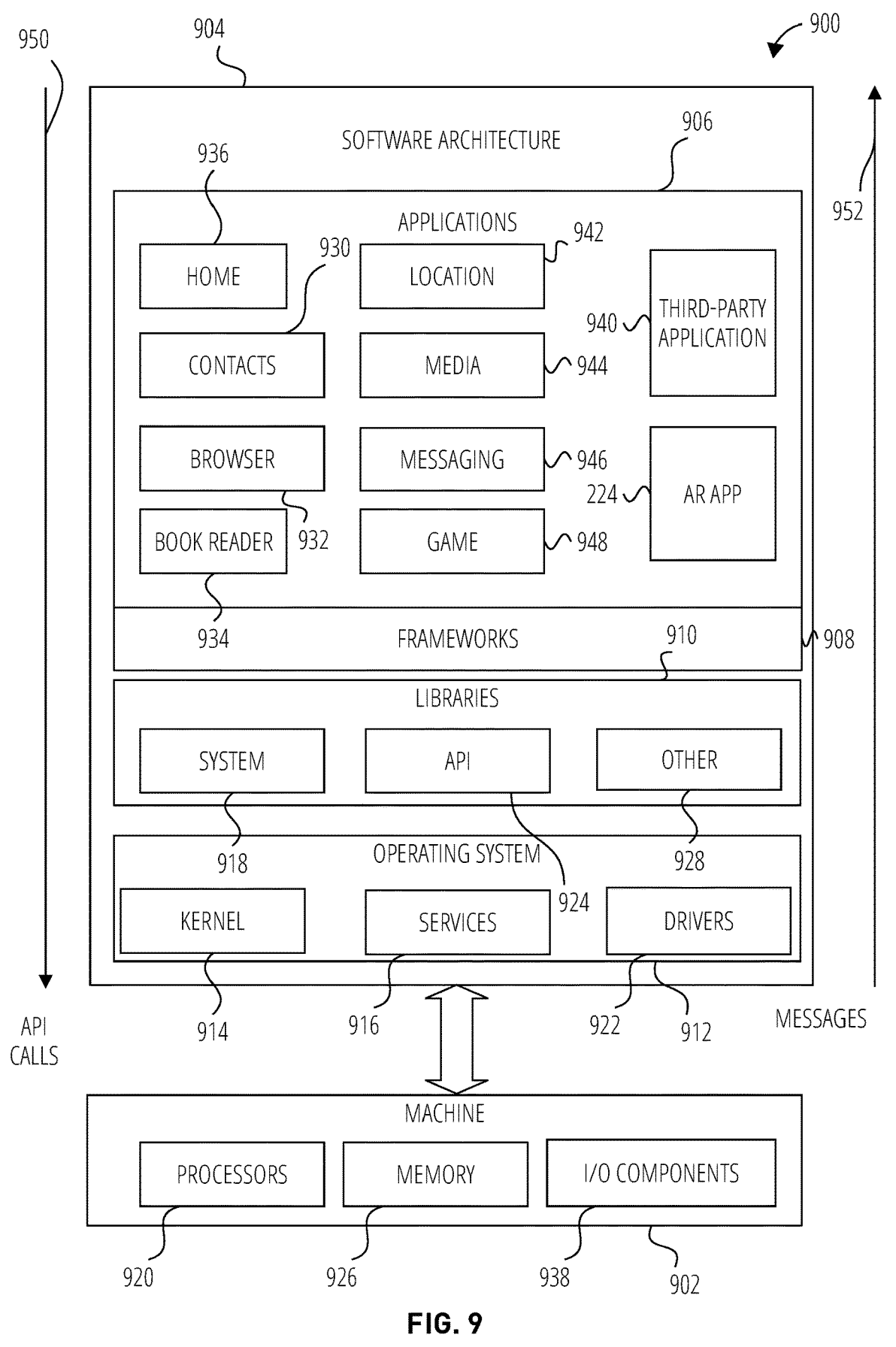

SOFTWARE ARCHITECTURE    906

936

APPLICATIONS    942

| HOME | 930 | LOCATION |
| --- | --- | --- |
| | | |

940    THIRD-PARTY APPLICATION

| CONTACTS | MEDIA | 944 |
| --- | --- | --- |

| BROWSER | MESSAGING | 946 |
| --- | --- | --- |

224    AR APP

| BOOK READER | 932 | GAME | 948 |
| --- | --- | --- | --- |

934    FRAMEWORKS    910    908

LIBRARIES

| SYSTEM | API | OTHER |
| --- | --- | --- |

918    OPERATING SYSTEM    928

| KERNEL | SERVICES | 924 | DRIVERS |
| --- | --- | --- | --- |

API CALLS    914    916    922    912    MESSAGES

952

MACHINE

| PROCESSORS | MEMORY | I/O COMPONENTS |
| --- | --- | --- |

HAND-BASED LIGHT ESTIMATION FOR EXTENDED REALITY

TECHNICAL FIELD

Subject matter disclosed herein relates, generally, to extended reality (XR). More specifically, but not exclusively, the subject matter relates to light estimation techniques that facilitate the rendering of virtual content in an XR environment.

BACKGROUND

The field of XR continues to grow. XR devices are able to overlay virtual content onto (or mix virtual content into) a user's perception of reality, providing a user experience that can be entertaining, informative, or useful.

BRIEF DESCRIPTION OF THE SEVERAL VIEWS OF THE DRAWINGS

In the drawings, which are not necessarily drawn to scale, like numerals may describe similar components in different views. To identify the discussion of any particular element or act more easily, the most significant digit or digits in a reference number refer to the figure number in which that element is first introduced. Some non-limiting examples are illustrated in the figures of the accompanying drawings in which:

FIG. 9 is a block diagram showing a software architecture within which the present disclosure may be implemented, according to some examples.

DETAILED DESCRIPTION

Figure 1:
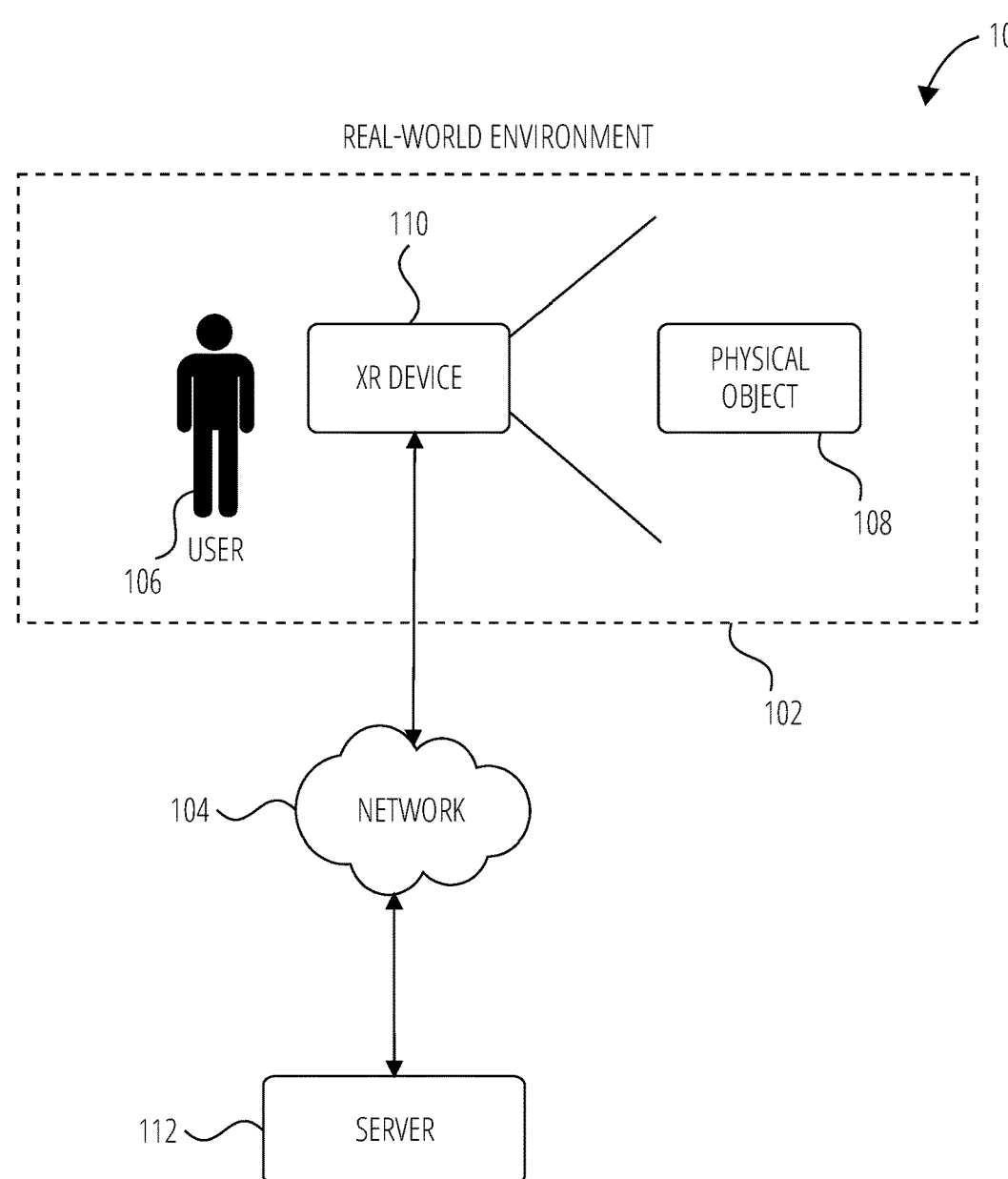
FIG. 1 is a block diagram illustrating a network environment for operating an XR device, according to some examples.

The description that follows describes systems, methods, techniques, instruction sequences, and computing machine program products that illustrate examples of the present subject matter. In the following description, for purposes of explanation, numerous specific details are set forth in order to provide an understanding of various examples of the present subject matter. It will be evident, however, to those skilled in the art, that examples of the present subject matter may be practiced without some or other of these specific details. Examples merely typify possible variations. Unless explicitly stated otherwise, structures are optional and may be combined or subdivided, and operations (e.g., in a procedure, algorithm, or other function) may vary in sequence or be combined or subdivided.

The field of XR includes augmented reality (AR) and virtual reality (VR). AR may include an interactive experience of a real-world environment where physical objects or environments that reside in the real world are "augmented" or enhanced by computer-generated digital content (also referred to as virtual content). AR may include a system that enables a combination of real and virtual worlds, real-time interaction, and three-dimensional (3D) presentation of virtual and real objects. A user of an AR system may perceive virtual content that appears to be attached or interact with a real-world physical object. In some examples, AR overlays digital content on the real world. Alternatively or additionally, AR combines real-world and digital elements. The term "AR" may thus include mixed reality experiences. The term "AR application" is used herein to refer to a computer-operated application that enables an AR experience.

VR may include a simulation experience of a virtual-world environment that is distinct from the real-world environment. Computer-generated digital content is displayed in the virtual-world environment. VR may also refer to a system that enables a user to be completely immersed in the virtual-world environment and to interact with virtual objects presented in the virtual-world environment. While examples described in the present disclosure focus primarily on XR devices that provide an AR experience, it will be appreciated that at least some aspects of the present disclosure may also be applied to VR.

A "user session" is used herein to refer to an operation of a device or application during periods of time. For example, a user session can include an operation of an AR application executing on a head-wearable XR device between the time the user puts on the XR device and the time the user takes off the head-wearable device. In some examples, a user session starts when an XR device is turned on or is woken up from sleep mode and stops when the XR device is turned off or placed in sleep mode. In other examples, the user session starts when the user runs or starts an AR application, or runs or starts a particular feature of the AR application, and stops when the user ends the AR application or stops the particular feature of the AR application.

A technical challenge in the field of XR is the accurate representation of the lighting conditions in the real world to ensure that digital augmentations blend sufficiently seamlessly with the user's environment or maintain an acceptable degree of visual coherence with the real world.

For example, in a dimly lit room, it would be desirable for an XR device to adjust the shadows and highlights on a virtual coffee cup to match the ambient lighting, ensuring that the virtual coffee cup resembles an actual cup placed on a table next to the user. As another example, when a user is outside on a sunny day, the XR device should simulate the bright, direct sunlight and corresponding sharp shadows on virtual objects, such as when rendering a virtual pet to appear walking in the field of view of the XR device.

Some techniques for estimating environmental lighting conditions rely on images of the head of the user. For example, a neural network can be trained to process an image of the user's head and infer the lighting conditions in the real-world environment. In other words, the user's head can be used as a light probe to facilitate the rendering of virtual content, such as augmentations that are overlaid onto the face. This can be useful, for example, where the user captures a "selfie camera" image and an AR application is used to apply augmentations to the face of the user. However, such techniques are not effective or available in all scenarios, particularly when the XR device is a head-worn device, in which case the user's head is outside of the field of view of the XR device.

Other techniques involve processing images of the entire scene captured by the XR device to estimate the lighting conditions. These techniques can be computationally intensive and thus have high latency and/or be unsuitable for devices with limited processing power or battery resources. Furthermore, the dynamic and interactive nature of real-world scenes can make it technically challenging to obtain accurate or useful lighting estimations. These and other technical constraints can result in rendering of virtual objects that do not properly integrate with the user's environment, thereby disrupting or reducing the quality of the XR experience.

Examples of the present disclosure address technical challenges by leveraging the user's hand as a dynamic light probe within an XR environment. A method may include capturing input data that includes images of the hand, detecting the hand's pose, and using a trained machine learning model to process the input data to estimate values of illumination parameters (e.g., incident illumination). These estimated illumination parameter values may then be used to render virtual objects with lighting that, for example, coherently blends with the real-world environment. This may provide a scalable framework that can operate on devices with varying levels of computational power or remotely over a network connection.

In some examples, such as when an XR device is worn on the head of the user, a hand can be a suitable candidate for light estimation. The hand is commonly used to interact with a head-worn XR device (e.g., to interact with virtual objects or to provide instructions by way of hand gestures) and thus often appears within the field of view. Furthermore, the hand can be localized within the real-world environment. Hand tracking can be performed to determine a position or zone of the hand within the real-world environment, and the light parameter estimate generated using the hand can then be used as a local light probe associated with the position or zone of the hand.

An example method includes obtaining, via an image sensor (e.g., a camera) of an XR device, an image (or multiple images) of a hand in a real-world environment, and processing at least part of the image to detect a pose of the hand. In some examples, the XR device is a head-mounted XR device, and the hand is a hand of a user of the XR device.

In some examples, a machine learning model is selected based on the detected pose. For example, based on the detected pose, a machine learning model may be selected from among a plurality of trained machine learning models. At least part of the image is then processed via the machine learning model to obtain estimated illumination parameter values associated with the hand. The estimated illumination parameter values may then be used to render virtual content to be presented by the XR device.

Examples described herein utilize a plurality of machine learning models, each uniquely associated with a respective hand gesture (e.g., a hand pose that depicts a certain gesture or signal). For example, a first machine learning model is associated with a pinching hand gesture. a second machine learning model is associated with a scaling hand gesture, and/or a third machine learning model is associated with a "thumbs-up" hand gesture. In the method, the selection of the machine learning model based on the detected pose may include identifying, from among a plurality of hand gestures, a hand gesture corresponding to the detected pose, and selecting the machine learning model that is associated with the hand gesture.

In some examples, each of the plurality of machine learning models is trained to estimate illumination parameter values from images depicting the respective hand gesture associated with the machine learning model. For example, if a captured image indicates that the hand is in a pinching position, the XR device may detect that the pose of the hand corresponds to a pinching hand gesture. In response thereto, the machine learning model that was trained on images depicting pinching hand gestures is selected for inference.

The machine learning models can, for example, include Convolutional Neural Networks (CNNs). Other machine learning models or adaptations thereof, such as Support Vector Machines (SVMs), may also be used.

The method may be used to estimate various illumination parameter values, depending, for example, on the illumination parameters needed for virtual content rendering in a particular use case. In some examples, estimated illumination parameter values include values indicative of incident illumination on the hand. For example, the estimated illumination parameter values can include values for a set of spherical harmonics coefficients representing the intensity and direction of light.

The estimated illumination parameter values may be applied as a local light probe associated with a position or zone of the hand within the real-world environment. As mentioned, the hand can be tracked by the XR device, enabling its position (e.g., within the real-world environment or relative to the XR device) to be determined. This allows for efficient estimation of lighting conditions at the position of the hand. In some examples, a set of estimated illumination parameter values provides one estimate for the entire hand, associated with one point in space. For example, the "position" or "zone" of the hand, as mentioned above, can be the center of a detected hand in 3D space, with the estimated illumination parameters providing a local light prove at the relevant point in 3D space.

The method may be performed continuously or periodically. For example, during a user session, the hand can be tracked and captured multiple times by the XR device while it moves across a room to obtain estimated illumination parameter values for various localized positions or zones within the room (e.g., local light provides for multiple points in 3D space across a room). This may enable the XR device to generate virtual content that blends in well with the real-world environment based on the availability of useful local lighting condition data for various positions or zones within the room.

In some examples, local light probe data generated using this method can be stored and/or utilized to supplement at least one other set of illumination parameter values that is not specific to the hand. For example, the method may be performed to supplement a more general image processing operation that infers ambient lighting conditions in a room as a whole. For instance, the XR device can execute a first light estimation operation that attempts to identify sources of light in the room, such as light emitted by a lightbulb or light entering the room through a window. The XR device may then also execute a second light estimation operation, which uses the hand as a local light probe as described herein, to obtain a more comprehensive dataset (or to resolve potential inconsistencies, unknown parameters, or anomalies).

The estimated illumination parameter values may facilitate rendering of the virtual content. For example, the estimated illumination parameter values can be used to generate an irradiance map. In some examples, the virtual content includes a virtual object, and the rendering of the virtual object includes generating a 3D model of the virtual object that has predetermined properties, and using the estimated illumination parameter values and the predetermined properties of the 3D model to obtain rendering characteristics for the virtual object. For example, the XR device can execute an AR application that has access to multiple virtual objects and their respective predetermined properties (e.g., a virtual apple or a virtual pet). The estimated illumination parameter values can then be applied to ensure that the virtual objects are rendered in a more realistic, coherent, or immersive manner.

The field of view of the XR device may include the hand and other features in the real-world environment. Accordingly, images captured by the XR device may include the hand and such other features. In some examples, to facilitate hand pose detection, the method includes performing segmentation to separate the hand from the other features. This can, for example, allow for only the hand (and not the other features), or only the hand and its close surroundings but not features that are farther away, to be processed via the selected machine learning model to perform lighting estimation, resulting in more accurate inference results.

Examples described herein relate to the training of machine learning models. In some examples, each of the plurality of machine learning models used for lighting estimations is trained on a respective training dataset comprising training images of hands in varying lighting conditions. For example, the training images can be synthetic images generated using a graphics engine that simulates the varying lighting conditions.

As mentioned, each of the plurality of machine learning models can be uniquely associated with a respective hand gesture. The training dataset of each machine learning model may include training images of hands depicting the respective hand gesture associated with that machine learning model and covering the varying lighting conditions referred to above. In some examples, each of the plurality of machine learning models is trained using supervised learning, and each respective training dataset further comprises, for each training image, corresponding illumination parameter values representing lighting conditions associated with a hand depicted in the training image.

The hand of a user wearing an XR device can thus be used to facilitate a more coherent XR experience. According to some examples, the presently described devices, systems, or methodologies provide an improvement to an operation of the functioning of a computing device by improving the ability of an XR device to estimate lighting conditions and render coherent virtual content.

Examples described herein provide for easier localization of lighting condition estimates, reduced inference times, and/or a reduction in computing resource requirements. Examples of such computing resources include processor cycles, network traffic, memory usage, data storage capacity, power consumption, network bandwidth, and cooling capacity.

A technical problem of achieving accurate light estimation in XR environments may be addressed or alleviated by obtaining an image of a hand in a real-world environment using an image sensor of an XR device. By focusing on the hand—a readily available and frequently present object in many XR interactions—system as described herein may leverage a unique and dynamic light probe that moves with the user. This approach may allow for a more accurate and context-sensitive estimation of lighting conditions. Particularly in the case of head-worn XR devices, the hand's visibility and variability in poses make it a good candidate for real-time light estimation, ensuring that virtual objects are rendered with lighting that closely matches the real-world environment, thereby enhancing the immersive experience.

Furthermore, a technical problem of performing light estimation-related inference quickly and efficiently may be addressed or alleviated by utilizing dedicated machine learning models for respective hand poses or gestures. A single machine learning model may either not be capable of accurately estimating lighting conditions for all possible hand poses, or only be able to do so if significant computing resources are available for inference. Examples described herein provide a more flexible approach that can accommodate a range of gestures users may employ while interacting with XR applications. The selection of the machine learning model based on a detected pose may involve identifying the hand gesture corresponding to the detected pose and selecting the model associated with that gesture. This approach may ensure that the system utilizes the most appropriate model for the current hand pose, allowing for a more precise estimation of illumination parameter values while being able to leverage a lightweight model. Consequently, virtual objects can be rendered with lighting that accurately reflects the real-world conditions, enhancing the realism and immersion of the XR experience.

Light estimation approaches may rely on complex, parameter-heavy models that require substantial processing power to estimate environmental lighting conditions accurately. This high computational demand can lead to increased latency, reduced battery life in portable devices, and an overall decrease in system performance, particularly in real-time applications where rapid processing is crucial for maintaining immersion and user engagement. Examples described herein address or alleviate this computational challenge by employing a set of more lightweight machine learning models that are only used when needed. By designing these models to be less computationally intensive, the system may be enabled to quickly process images and estimate lighting conditions with reduced impact on system resources, while still obtaining desired accuracy. In this way, the realism or coherence of virtual content may still be improved, but the usability of AR applications is extended by conserving computing resources, such as battery life.

FIG. 1 is a network diagram illustrating a network environment 100 suitable for operating an XR device 110, according to some examples. The network environment 100 includes an XR device 110 and a server 112, communicatively coupled to each other via a network 104. The server 112 may be part of a network-based system. For example, the network-based system can be or include a cloud-based server system that provides additional information, such as virtual content (e.g., 3D models of virtual objects, or augmentations to be applied as virtual overlays onto images depicting real-world scenes) to the XR device 110.

A user 106 operates the XR device 110. The user 106 may be a human user (e.g., a human being), a machine user (e.g., a computer configured by a software program to interact with the XR device 110), or any suitable combination thereof (e.g., a human assisted by a machine or a machine supervised by a human).

The user 106 is not part of the network environment 100, but is associated with the XR device 110. For example, where the XR device 110 is a head-wearable apparatus, the user 106 wears the XR device 110 during a user session. In examples described herein that relate to hand-based light estimation, the user 106 can be a human user, with the XR device 110 being configured to capture images of one or both hands of the user 106 during a user session.

The XR device 110 may have different display arrangements. In some examples, the display arrangement may include a screen that displays what is captured with a camera of the XR device 110. In other examples, the display of the device may be transparent or semi-transparent. In other examples, the display may be non-transparent and wearable by the user to cover the field of vision of the user.

In some examples, the user 106 operates an application of the XR device 110, referred to herein as an AR application. The AR application may be configured to provide the user 106 with an experience triggered or enhanced by a physical object 108, such as a two-dimensional (2D) physical object (e.g., a picture), a 3D physical object (e.g., a statue), a location (e.g., at factory), or any references (e.g., perceived corners of walls or furniture, or digital codes) in a real-world environment 102. For example, the user 106 can point a camera of the XR device 110 to capture an image of the physical object 108 and a virtual overlay may be presented over the physical object 108 via the display.

Experiences may also be triggered or enhanced by a hand or other body part of the user 106. For example, the XR device 110 may detect and respond to hand gestures or signals. As mentioned, for coherent rendering in XR, the XR device may be configured to estimate or detect illumination in order to blend augmentations with features of the real-world environment 102. When using some XR devices, such as head-worn devices (also referred to as head-mounted devices, or "HMDs"), the hand of the user serves as an interaction tool. As a result, the hand is often "visible" to the XR device 110, making it a good candidate to serve as a local light probe for light estimation, as described elsewhere herein. However, examples described herein are not necessarily limited to head-worn devices and can also be applied in other devices, such as mobile phones.

The XR device 110 includes tracking components (not shown in FIG. 1). The tracking components track the pose (e.g., position, orientation, and location) of the XR device 110 relative to the real-world environment 102 using image sensors (e.g., depth-enabled 3D camera and image camera), inertial sensors (e.g., gyroscope, accelerometer, or the like), wireless sensors (e.g., Bluetooth™ or Wi-Fi™), a Global Positioning System (GPS) sensor, and/or audio sensor to determine the location of the XR device 110 within the real-world environment 102. In some examples, the tracking components track the pose of the hand (or hands) of the user 106 or some other physical object 108 in the real-world environment 102.

In some examples, the server 112 is used to detect and identify the physical object 108 based on sensor data (e.g., image and depth data) from the XR device 110, and determine a pose of the XR device 110, the physical object 108 and/or the hand of the user 106 based on the sensor data. The server 112 can also generate virtual content based on the pose of the XR device 110, the physical object 108, and/or the hand.

In some examples, the server 112 communicates virtual content (e.g., a virtual object) to the XR device 110. The XR device 110 or the server 112, or both, can perform image processing, object detection and object tracking functions based on images captured by the XR device 110 and one or more parameters internal or external to the XR device 110.

The object recognition, tracking, and AR rendering can be performed on either the XR device 110, the server 112, or a combination between the XR device 110 and the server 112. Accordingly, while certain functions are described herein as being performed by either an XR device or a server, the location of certain functionality may be a design choice (unless specifically indicated to the contrary). For example, it might be technically preferable to deploy particular technology and functionality within a server system initially, but later to migrate this technology and functionality to a client installed locally at the XR device where the XR device has sufficient processing capacity.

Any of the machines, components, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 10. Moreover, any two or more of the machines, components, or devices illustrated in FIG. 1 may be combined into a single machine, component, or device, and the functions described herein for any single machine, component, or device may be subdivided among multiple machines, components, or devices.

The network 104 may be any network that enables communication between or among machines (e.g., server 112), databases, and devices (e.g., XR device 110). Accordingly, the network 104 may be a wired network, a wireless network (e.g., a mobile or cellular network), or any suitable combination thereof. The network 104 may include one or more portions that constitute a private network, a public network (e.g., the Internet), or any suitable combination thereof.

Figure 2:
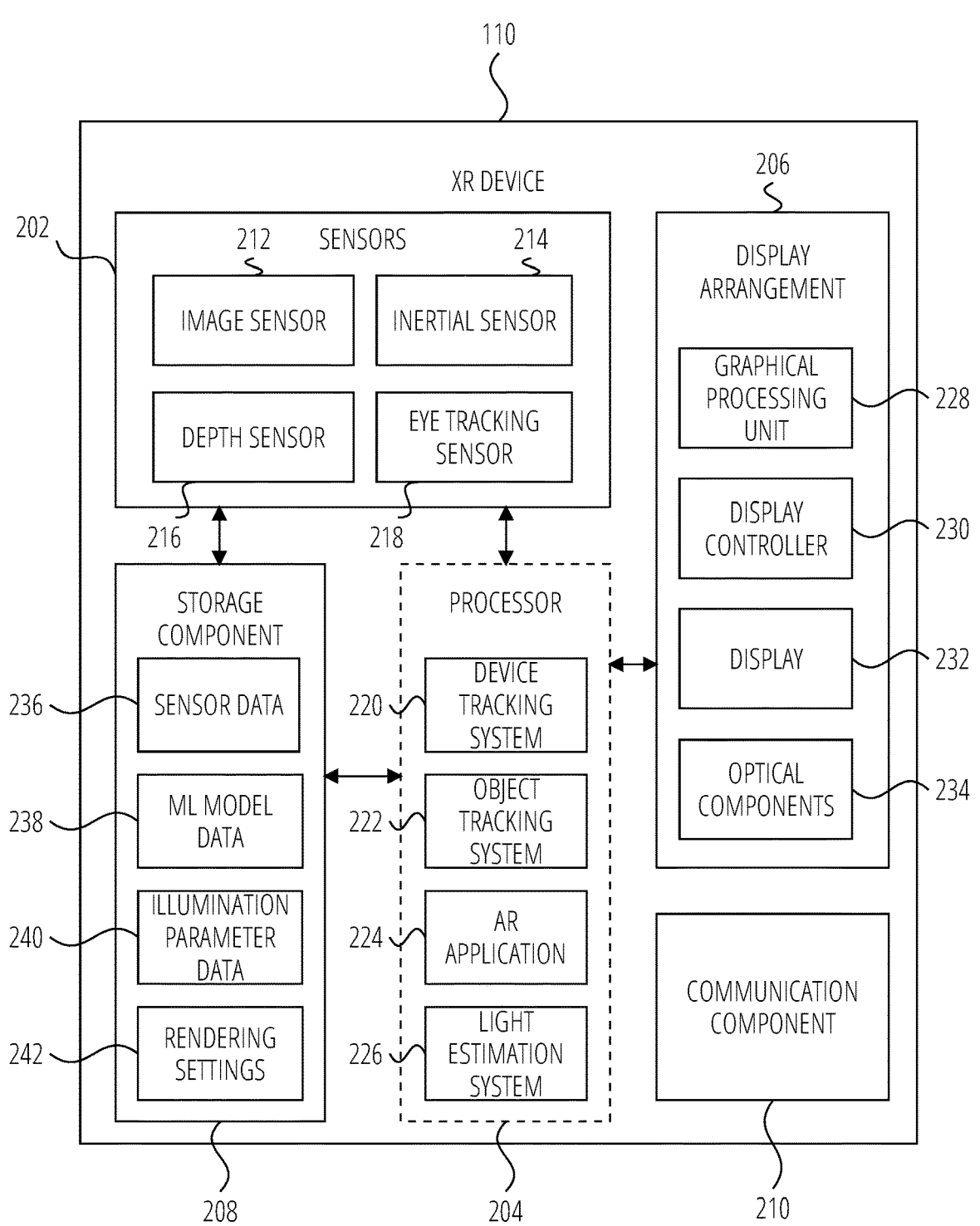
FIG. 2 is a block diagram illustrating components of an XR device, according to some examples.

FIG. 2 is a block diagram illustrating components (e.g., modules, parts, or systems) of the XR device 110 of FIG. 1, according to some examples. The XR device 110 is shown in FIG. 2 to include sensors 202, a processor 204, a display arrangement 206, a storage component 208, and a communication component 210. It will be appreciated that FIG. 2 is not intended to provide an exhaustive indication of components of the XR device 110.

The sensors 202 include one or more image sensors 212, one or more inertial sensors 214, one or more depth sensors 216, and one or more eye tracking sensors 218. The image sensor 212 can include, for example, a combination of a color camera, a thermal camera, a depth sensor, and one or multiple grayscale, global shutter tracking cameras.

In some examples, the inertial sensor 214 includes a combination of a gyroscope, accelerometer, and a magnetometer. In some examples, the inertial sensor 214 includes one or more Inertial Measurement Units (IMUs). An IMU enables tracking of movement of a body by integrating the acceleration and the angular velocity measured by the IMU. An IMU can include a combination of accelerometers and gyroscopes that can determine and quantify linear acceleration and angular velocity, respectively. The values obtained can be processed to obtain the pitch, roll, and heading of the IMU and, therefore, of the body with which the IMU is associated. Signals from the accelerometers of the IMU also can be processed to obtain velocity and displacement. The IMU may also include one or more magnetometers.

The depth sensor 216 may include one or a combination of a structured-light sensor, a time-of-flight sensor, passive stereo sensor, or an ultrasound device. The eye tracking sensor 218 is configured to monitor the gaze direction of the user, providing data for various applications, such as adjusting the focus of displayed content or determining where to render virtual content. The XR device 110 may include one or multiple of these sensors, such as infrared eye tracking sensors, corneal reflection tracking sensors, or video-based eye-tracking sensors.

Other examples of sensors 202 include a proximity or location sensor (e.g., near field communication, GPS, Bluetooth™, or Wi-Fi™), an audio sensor (e.g., a microphone), or any suitable combination thereof. It is noted that the sensors 202 described herein are for illustrative purposes and the sensors 202 are thus not limited to the ones described above.

The processor 204 executes or facilitates implementation of a device tracking system 220, an object tracking system 222, an AR application 224, and a light estimation system 226.

The device tracking system 220 estimates a pose of the XR device 110. For example, the device tracking system 220 uses data from the image sensor 212 and the inertial sensor 214 to track a location and pose of the XR device 110 relative to a frame of reference (e.g., real-world environment 102). In some examples, the device tracking system 220 uses sensor data from the sensors 202 to determine the pose of the XR device 110. The pose may be a determined orientation and position of the XR device 110 in relation to the user's real-world environment 102.

In some examples, the device tracking system 220 continually gathers and uses updated sensor data describing movements of the XR device 110 to determine updated poses of the XR device 110 that indicate changes in the relative position and orientation of the XR device 110 from the physical objects in the real-world environment 102. In some examples, the device tracking system 220 provides the pose of the XR device 110 to a graphical processing unit 228 of the display arrangement 206.

The object tracking system 222 enables the tracking of an object, such as the physical object 108 of FIG. 1, or a hand of a user. The object tracking system 222 may include a computer-operated application or system that enables a device or system to track visual features identified in images captured by one or more image sensors, such as one or more cameras. In some examples, the object tracking system builds a model of a real-world environment based on the tracked visual features. An object tracking system may implement one or more object tracking machine learning models to track an object in the field of view of a user during a user session. The object tracking machine learning model may comprise a neural network trained on suitable training data to identify and track objects in a sequence of frames captured by the XR device 110. The object tracking machine learning model may use an object's appearance, motion, landmarks, and/or other features to estimate location in subsequent frames.

The object tracking system 222 may thus be used to track a hand of a user of the XR device 110 (or a hand of another person in the field of view of the XR device 110). The object tracking system 222 may also perform gesture detection. For example, the object tracking system 222 uses the sensor data to determine a pose of the hand (or changes in the pose of the hand), and then performs processing to detect a gesture.

A gesture detection machine learning model may be used to perform gesture detection. For example, the object tracking system 222 may execute a neural network trained on suitable training data to identify a hand gesture in a frame or sequence of frames captured by the XR device 110. In some examples, the object tracking system 222 tracks the hand to obtain its pose, performs segmentation on captured images to isolate the hand, and then inputs the isolated hand into a neural network for processing and gesture detection.

In some examples, the device tracking system 220 and/or the object tracking system 222 implements a "SLAM" (Simultaneous Localization and Mapping) system to understand and map a physical environment in real-time. This allows, for example, the XR device 110 to accurately place digital objects in the real world and track their position as a user moves and/or as objects move. The XR device 110 may include a "VIO" (Visual-Inertial Odometry) system that combines data from an IMU and a camera to estimate the position and orientation of an object in real-time.

The AR application 224 may retrieve virtual content, such as a virtual object (e.g., 3D object model) or other augmentation, based on an identified physical object 108, physical environment (or other real-world feature), or user input (e.g., a detected gesture). The graphical processing unit 228 of the display arrangement 206 causes display of the virtual object, augmentation, or the like.

In some examples, the AR application 224 includes a local rendering engine that generates a visualization of a virtual object overlaid (e.g., superimposed upon, mixed with, or otherwise displayed in tandem with) on an image of the physical object 108 (or other real-world feature) captured by the image sensor 212. A visualization of the virtual object may be manipulated by adjusting a position of the physical object or feature (e.g., its physical location, orientation, or both) relative to the image sensor 212. Similarly, the visualization of the virtual object may be manipulated by adjusting a pose of the XR device 110 relative to the physical object or feature.

As mentioned, an XR device may detect or estimate lighting parameters to facilitate the rendering of virtual content. A light estimation system 226 is configured to estimate lighting conditions by analyzing images captured by the sensors 202. The light estimation system 226 may execute illumination estimation algorithms and/or models to determine and/or infer the lighting conditions present in the user's environment. The light estimation system 226 may output values for illumination parameters that describe, for example, the direction, intensity, and color of light sources in a scene. The graphical processing unit 228 may utilize the values to render the virtual content within the XR environment. This ensures that virtual content is "lit" in a manner consistent with real-world lighting, enhancing visual coherence and immersion of an XR experience.

In some examples, the light estimation system 226 calculates values associated with incident illumination, thereby mapping or representing light that arrives at a particular point or points in space from various directions. Incident illumination may determine how light interacts with a virtual object. Spherical harmonics coefficients can be used to represent the shape and intensity of incident illumination in a scene. Spherical harmonics are a tool used to approximate the distribution of light around an object. They can provide a compact representation of a lighting environment, usable to recreate complex lighting effects in an efficient manner.

The light estimation system 226 may generate an irradiance map that stores intensity of incident illumination across one or more surfaces.

The light estimation system 226 can utilize various image processing techniques, including those involving processing of images via machine learning models, to calculate or estimate values representing lighting conditions. In some examples, the light estimation system 226 utilizes the hand of the user as a local light probe by inferring illumination parameter values based on features associated with the hand as captured by the sensors 202.

The display arrangement 206 may also include a display controller 230, a display 232, and optical components 234. The display 232 may include a screen or panel configured to display images generated by the processor 204 or the graphical processing unit 228. In some examples, the display 232 may be transparent or semi-transparent so that the user 106 can see through the display 232.

The display 232 may be positioned in the gaze path of the user, or the display 232 may be offset from the gaze path of the user, with the optical components 234 directing light from the display 232 into the gaze path. The optical components 234 may include, for example, one or more mirrors, one or more lenses, or one or more beam splitters.

Referring again to the graphical processing unit 228, the graphical processing unit 228 may include a render engine that is configured to render a frame of a 3D model of a virtual object based on the virtual content provided by the AR application 224 and the pose of the XR device 110 (and, in some cases, the position of a tracked object). In other words, the graphical processing unit 228 uses the pose information as well as predetermined content data to generate frames of virtual content to be presented on the display 232. For example, the graphical processing unit 228 uses the pose to render a frame of the virtual content such that the virtual content is presented at an orientation and position in the display 232 to properly augment the user's reality.

As an example, the graphical processing unit 228 may use the pose data to render a frame of virtual content such that, when presented on the display 232, the virtual content is caused to be presented to a user so as to overlap with a physical object in the user's real-world environment 102. The graphical processing unit 228 can generate updated frames of virtual content based on updated poses of the XR device 110 and updated tracking data generated by the abovementioned tracking components, which reflect changes in the position and orientation of the user in relation to physical objects in the user's real-world environment 102, thereby resulting in a more immersive experience.

In some examples, the XR device 110 uses predetermined properties of a virtual object (e.g., an object model with certain dimensions, textures, transparency, and colors) along with lighting estimates and pose data to render virtual content within an XR environment in a way that is visually coherent with the real-world lighting conditions.

The predetermined properties of a virtual object may determine how the object interacts with light (e.g., defined in a content development phase by a developer). The lighting parameter values provided by the light estimation system 226 describe characteristics of the real-world environment. These parameters may include the direction, intensity, color, and distribution of light sources as estimated. The lighting parameters may be represented in a format that can be directly used in rendering calculations, such as spherical harmonics coefficients for ambient lighting or vectors for directional light sources.

The graphical processing unit 228 may utilize the aforementioned data in various ways during rendering. For example:

The vertices of the virtual object can be adjusted based on pose data, positioning it correctly within the virtual scene. Pose data can thus be used to determine where and how to render the virtual object.

The calculated lighting or lighting estimates can be used to calculate how the lighting affects its appearance. This may involve using the lighting estimates to apply shading models which take into account the light's interaction with the object's materials and textures.

Calculated lighting or lighting estimates can be applied to the virtual object, creating realistic highlights, shadows, and color variations based on the estimated real-world lighting conditions. The graphical processing unit 228 may use incident illumination data to determine how light sources affect the appearance of the virtual object. For example, the graphical processing unit 228 can use values for spherical harmonics coefficients to apply ambient lighting to the virtual object. In some examples, as mentioned above, an irradiance map can be utilized for efficient rendering of complex lighting scenarios (e.g., where multiple light sources or interreflections are present).

In post-processing, additional effects such as bloom, ambient occlusion, or depth of field may be applied to enhance the realism or artistic style of the rendered content.

The graphical processing unit 228 transfers a rendered frame (with the virtual content to which the aforementioned processing has been applied) to the display controller 230. In some examples, the display controller 230 is positioned as an intermediary between the graphical processing unit 228 and the display 232, receives the image data (e.g., rendered frame) from the graphical processing unit 228, re-projects the frame (by performing a warping process) based on a latest pose of the XR device 110 (and, in some cases, object tracking pose forecasts or predictions), and provides the re-projected frame to the display 232.

It will be appreciated that, in examples where an XR device includes multiple displays, each display may have a dedicated graphical processing unit and/or display controller. It will further be appreciated that where an XR device includes multiple displays, e.g., in the case of AR glasses or any other AR device that provides binocular vision to mimic the way humans naturally perceive the world, a left eye display arrangement and a right eye display arrangement may deliver separate images or video streams to each eye. Where an XR device includes multiple displays, steps may be carried out separately and substantially in parallel for each display, in some examples, and pairs of features or components may be included to cater for both eyes.

For example, an XR device may capture separate images for a left eye display and a right eye display (or for a set of right eye displays and a set of left eye displays), and render separate outputs for each eye to create a more immersive experience and to adjust the focus and convergence of the overall view of a user for a more natural, 3D view. Thus, while a single set of display arrangement components may be discussed to describe some examples, e.g., display layers and other optical components that direct images to one eye, similar techniques may be applied to cover both eyes by providing a further set of display arrangement components.

The storage component 208 may store various data, such as sensor data 236, machine learning model data 238, illumination parameter data 240, and rendering settings 242.

Sensor data 236 may include data obtained from one or more of the sensors 202, such as image frames captured by the cameras and IMU data including inertial measurements. In some examples, some of the data of the storage component 208 are stored at the XR device 110 while other data are stored at the server 112.

The machine learning model data 238 may include data of machine learning models, such as model parameters and rules for handling model input or output. As described elsewhere herein, the machine learning model data 238 may include machine learning models used for hand-based light estimation. In some examples, each hand-based light estimation model is stored in association with a specific hand gesture that can be recognized by the XR device 110. In some examples, the machine learning model data 238 is structured to allow for quick retrieval and loading of the appropriate model based on the detected hand pose, ensuring efficient and accurate lighting estimation.

The illumination parameter data 240 may include estimated lighting parameters that have been previously calculated by the XR device 110 or a server connected to the XR device 110. This data can include, but is not limited to, spherical harmonics coefficients, light source positions, intensities, colors, and other relevant metadata that describes the lighting environment within the XR experience. The illumination parameter data 240 can be used to quickly adjust the rendering of virtual objects in response to changes in the user's environment or to maintain consistency in lighting when the user revisits a previously mapped space.

The rendering settings 242 may include configuration data stored within the storage component 208 that regulates how virtual content is rendered by the XR device 110 (e.g., via the graphical processing unit 228). The rendering settings 242 may include instructions determining visual fidelity, performance parameters, and lighting techniques applied during the rendering process. For example, the rendering settings 242 can include shader profiles, texture quality settings, resolution, frame rate targets, and other graphical preferences that can be customized to balance visual quality with computational efficiency.

The communication component 210 of the XR device 110 enables connectivity and data exchange. For example, the communication component 210 enables wireless connectivity and data exchange with external networks and servers, such as the server 112 of FIG. 1. This can allow certain functions described herein to be performed at the XR device 110 and/or at the server 112.

The communication component 210 may allow the XR device 110 to transmit and receive data, including software updates, machine learning models, and cloud-based processing tasks. In some examples, the communication component 210 facilitates the offloading of computationally intensive tasks to the server 112. Additionally, the communication component 210 can allow for synchronization or networking with other devices in a multi-user XR environment, enabling participants to have a consistent and collaborative experience (e.g., in a multi-player AR game or an AR presentation mode).

Figure 3:
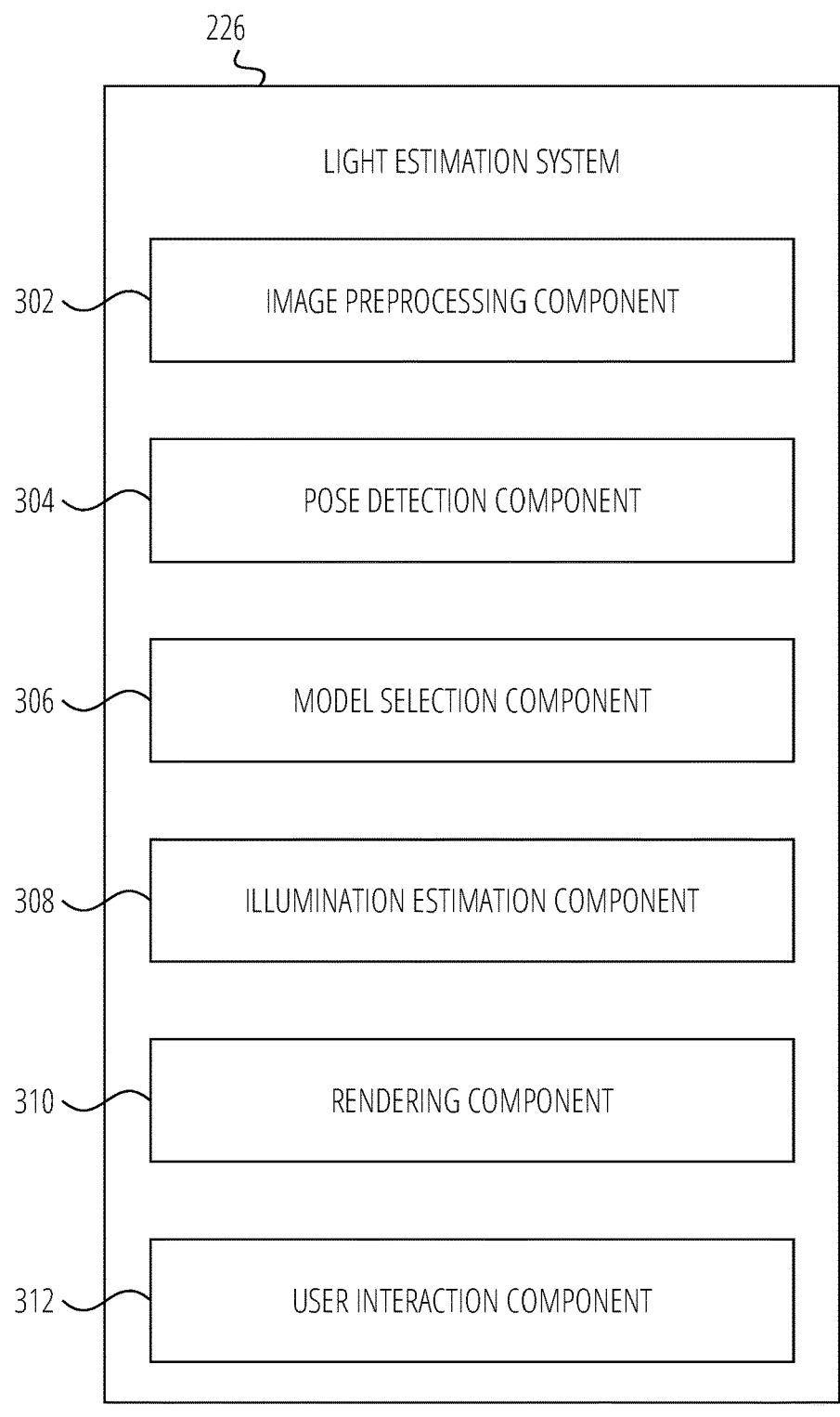
FIG. 3 is a block diagram illustrating components of a light estimation system associated with an XR device, according to some examples.

FIG. 3 is a block diagram illustrating components of the light estimation system 226 of FIG. 2, according to some examples. The light estimation system 226 of FIG. 3 is shown to include an image preprocessing component 302, a pose detection component 304, a model selection component 306, an illumination estimation component 308, a rendering component 310, and a user interaction component 312. These components may operate together with each other and other components of the XR device 110 to facilitate the processing of images, detection of hand poses, selection of machine learning models, estimation of illumination parameters, rendering of virtual content, and user interaction.

Although the components are shown to form part of the light estimation system 226, it is noted that some of the components of the light estimation system 226 may be provided or supported by other components or subsystems of the XR device 110, such as the object tracking system 222 or the graphical processing unit 228.

The image preprocessing component 302 is responsible for preprocessing images captured by the sensors 202 of the XR device 110 (e.g., one or more RGB cameras). In some examples, the image preprocessing component 302 is designed to prepare captured images for further analysis by enhancing image quality and/or extracting relevant features. This may involve adjusting brightness and contrast, reducing noise, and/or converting images to a format or color space more suitable for subsequent processing steps. This may also involve performing segmentation to isolate one or more relevant features. For example, segmentation may be performed to isolate or partially isolate a hand depicted in an image frame.

As described with reference to FIG. 2, the XR device 110 is configured to track objects, such as a hand of the user of the XR device 110 (e.g., a user wearing the XR device 110). The pose detection component 304 may operate with the object tracking system 222 of the XR device 110 to analyze preprocessed images to detect the pose of the user's hand. The object tracking system 222 and/or pose detection component 304 can utilize computer vision algorithms and/or deep learning models to analyze an image to recognize a hand gesture.

The XR device 110 may be configured to allow for slight variations in a hand pose. For example, a real hand may differ from hand images used to train a machine learning model. Furthermore, users' hands may naturally differ, and therefore also the manner in which they perform gestures. The XR device 110 may thus be enabled to generalize a detected pose to one of a plurality of predetermined poses or gestures, e.g., through pose normalization.

The model selection component 306 is configured to choose a machine learning model from a plurality of trained machine learning models based on the detected hand pose. In some examples, each model in a set of models used for illumination estimation is uniquely associated with a certain hand gesture, allowing the model selection component 306 to select the most suitable model for the current pose. For example, if a user's hand is detected in an open palm pose, the model selection component 306 selects a model specifically trained for estimating light conditions when the hand is in that position.

In some examples, the XR device 110 or the server 112 stores a predefined mapping between poses and respective models. For example, once the XR device 110 has detected a particular hand pose, it uses the predefined mapping to determine which machine learning model to use for lighting estimation.

The illumination estimation component 308 is used to process one or more images using the selected machine learning model (e.g., a trained CNN) to estimate illumination parameter values. The illumination estimation component 308 may cause a captured image, or at least part thereof (e.g., the part depicting the hand) to be processed via the selected machine learning model.

The image or part thereof may be preprocessed prior to providing it to the machine learning model, as also described above. The machine learning model is trained to recognize and interpret various features and patterns from a training dataset that includes hand images in varying lighting conditions. These features and patterns may encompass the shape, texture, and color of hands as they appear under various lighting scenarios. Where each machine learning model is associated with a particular hand gesture, the machine learning model may be trained using hand images depicting the particular hand gesture as well as corresponding illumination parameter values (thus providing a supervised learning approach). Machine learning model training is described further with reference to FIG. 5, FIG. 6, and FIG. 7.

When a hand image is captured during inference, it may not exactly match the conditions a machine learning model was trained on. The captured hand's pose, shape, or lighting might differ from those in the training dataset. The real hand image may be preprocessed to make its features more compatible with what the model has learned. This may involve pose normalization (adjusting the hand's pose to a more standard version of that pose), segmentation (isolating the hand from the background), and/or applying transformations to the hand's shape or appearance.

Once the hand image has been adjusted or preprocessed (to the extent needed), the machine learning model processes it to estimate or infer the lighting conditions in the real world (in the position or zone of the hand). The machine learning model then outputs illumination parameter values inferred based on the processed image data. For example, the illumination estimation component 308 may output a set of values for spherical harmonics coefficients that represent the incident illumination on the captured hand, or part thereof.

In some examples, model parameters of the selected machine learning model are stored locally on the XR device 110, allowing the XR device 110 to perform inference locally to reduce latency. In other examples, the XR device 110 may communicate, to the server 112, an instruction to perform inference and return the lighting estimates.

The rendering component 310 uses the estimated illumination parameter values to facilitate rendering of virtual content. For example, the rendering component 310 operates with the graphical processing unit 228 to ensure that virtual objects are displayed with lighting that enhances the visual coherence of an XR experience, based on the estimates provided by the illumination estimation component 308. This process may allow for virtual objects to appear as if they are naturally part of the user's environment, with shadows, highlights, and colors that match the real-world lighting. For instance, the rendering component 310 can provide the outputs generated by the illumination estimation component 308 to the graphical processing unit 228 (e.g., together with the location or zone for which the estimation was generated) for rendering a virtual ball presented as if placed in the user's hand while the user is standing in a room, allowing the graphical processing unit 228 to render the virtual ball with characteristics (e.g., shading) consistent with the room's lighting, thereby enhancing the immersive experience.

The user interaction component 312 may facilitate user engagement with the XR device 110 to obtain lighting-related inputs. For example, the user interaction component 312 may instruct the user to perform a certain hand gesture (e.g., via a text instruction presented on the display 232 or via an audio instruction to the user), allowing the other components of the light estimation system 226 to perform lighting estimation.

However, it is noted that, in other examples, the XR device 110 does not provide explicit instructions to the user to perform a certain gesture. Instead, the XR device 110 relies on one or more gestures commonly performed by the user and simply processes such one or more gestures "in the background" once they are detected, thereby obtaining lighting estimates without having to request a specific action from the user. For example, as part of a normal XR experience, a user could grab and move a virtual object by making a specific hand gesture, with the light estimation system 226 utilizing captured images of the hand making the specific hand gesture to obtain or infer local illumination parameter values. In such a case, the grabbing hand gesture or the moving hand gesture may have a corresponding, pretrained machine learning model for inferring illumination parameter values based on images depicting the respective hand gesture.

In some examples, at least some of the components shown in FIG. 2 or FIG. 3 are configured to communicate with each other to implement aspects described herein. One or more of the components described may be implemented using software, hardware (e.g., one or more processors of one or more machines) or a combination of hardware and software. For example, a component described herein may be implemented by a processor configured to perform the operations described herein for that component. Moreover, two or more of these components may be combined into a single component, or the functions described herein for a single component may be subdivided among multiple components. Furthermore, according to various examples, components described herein may be implemented using a single machine, database, or device, or be distributed across multiple machines, databases, or devices.

Figure 4:
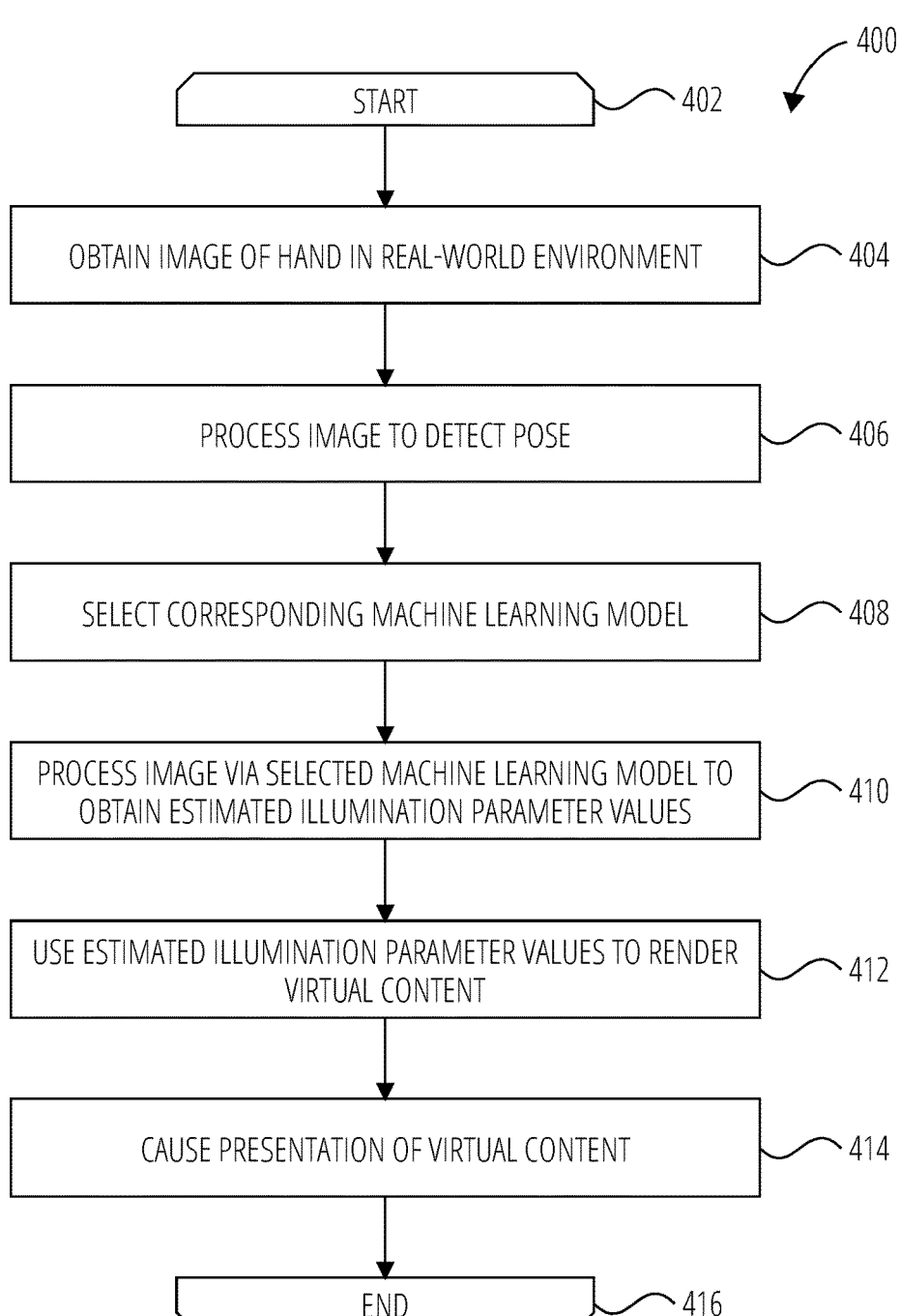
FIG. 4 is a flowchart of a method for performing hand-based light estimation and rendering of virtual content, according to some examples.

FIG. 4 is a flowchart of a method 400 for performing hand-based light estimation and rendering of virtual content, according to some examples. The method 400 may be performed by an XR device such as the XR device 110 of FIG. 1. The XR device 110 is thus referred to below as a non-limiting example to illustrate the method 400.

The method 400 commences at opening loop element 402 and proceeds to operation 404, where the XR device 110 obtains an image of a hand in the real-world environment 102. For example, the user 106 of FIG. 1 wears the XR device 110 as an HMD and commences a user session (e.g., the user 106 may initiate an AR game, an AR presentation mode, a collaboration with other AR users, or a general AR experience in which the user 106 performs multiple tasks in an AR environment). During the user session, the XR device 110 uses its sensors 202 to capture an image (or multiple images) that includes a hand of the user 106. The operation 404 provides "raw" visual data needed for pose detection and subsequent illumination estimation.

At operation 406, the XR device 110 processes the captured image to detect the pose of the hand. For example, the light estimation system 226 and/or the object tracking system 222 can be used to identify the pose of the hand (e.g., the hand is an open palm position, the hand is in a "thumbs-up" position, or the hand is performing a scaling gesture).

The method 400 proceeds to operation 408, where the XR device 110 (or the server 112) selects a machine learning model that corresponds to the detected hand pose. In some examples, this selection is based on the association of each model with a certain hand gesture, ensuring that the most accurate model is used for estimating illumination parameters. At operation 410, the XR device 110 processes the image using the selected machine learning model to obtain estimated illumination parameter values.

The selected machine learning model may output estimated illumination parameter values in the form of a spherical harmonics light probe. The light probe may provide a local light probe at the position or zone of the tracked hand of the user (e.g., at a 3D point in space determined by a SLAM system that corresponds to a center of the hand). At operation 412, the XR device 110 uses the estimated illumination parameter values to render virtual content for presentation during the user session. As mentioned, the light estimation system 226 can work with the graphical processing unit 228 to apply the illumination parameters to the virtual content. For instance, the graphical processing unit 228 can adjust a virtual object's visual appearance to reflect the lighting conditions of the surrounding environment.

Operation 412 may involve rendering the virtual content and then relighting the virtual content using the estimated illumination parameter values. The spherical harmonics light probe obtained from the selected machine learning model can be used to generate an irradiance map to relight virtual content that includes one or more 3D virtual objects. The XR device 110 may utilize predetermined properties of a 3D object model and then update the 3D object model based on the estimated illumination parameter values for suitable rendering.

The method 400 proceeds to operation 414, where the XR device 110 causes presentation of the virtual content to the user 106. For example, the XR device 110 uses the display arrangement 206 of FIG. 2 to present the virtual content. Operation 414 may involve displaying a rendered virtual object within the user's field of view, overlaying the virtual object onto the real-world environment 102 to create an XR experience during the user session. The method 400 concludes at closing loop element 416.

It is noted that operations in the method 400 may be repeated, thereby performing lighting estimation continuously or periodically during the user session. For example, the hand of the user 106 can be tracked by the XR device 110 as its position changes in the real-world environment 102. The XR device 110 then obtains estimated illumination parameter values using operations of the method 400 to generate local light probe data for various positions or zones within the real-world environment 102. In this way, the XR device 110 can obtain comprehensive lighting information to ensure that virtual content is rendered in realistic and/or coherent manner.

As mentioned, the XR device 110 can utilize a SLAM system to understand and map a physical environment in real-time. This map can then be linked to lighting information to allow the XR device 110 to construct not only a map of the structural features of the physical environment but also of its lighting conditions. The local light probe data obtained using operations of the method 400 can also be used to supplement or resolve other lighting information. For example, a neural network trained to process an entire scene (non-hand-specific) and infer ambient lighting conditions (e.g., average light intensity) can be executed together with a hand-specific neural network based on the method 400. Localized data points obtained using the hand-specific neural network can then be compared against more general data to resolve anomalies or improve lighting data accuracy.

Illumination parameter values obtained using the method 400 may also be stored for subsequent use. For example, the user 106 can end the user session and then start a new user session in the same real-world environment 102 (e.g., in the same room) a few minutes later. The XR device 110 detects that illumination parameter values have already been obtained for the real-world environment 102, and automatically reuses the illumination parameter values to render virtual content during the new user session.

Figure 5:
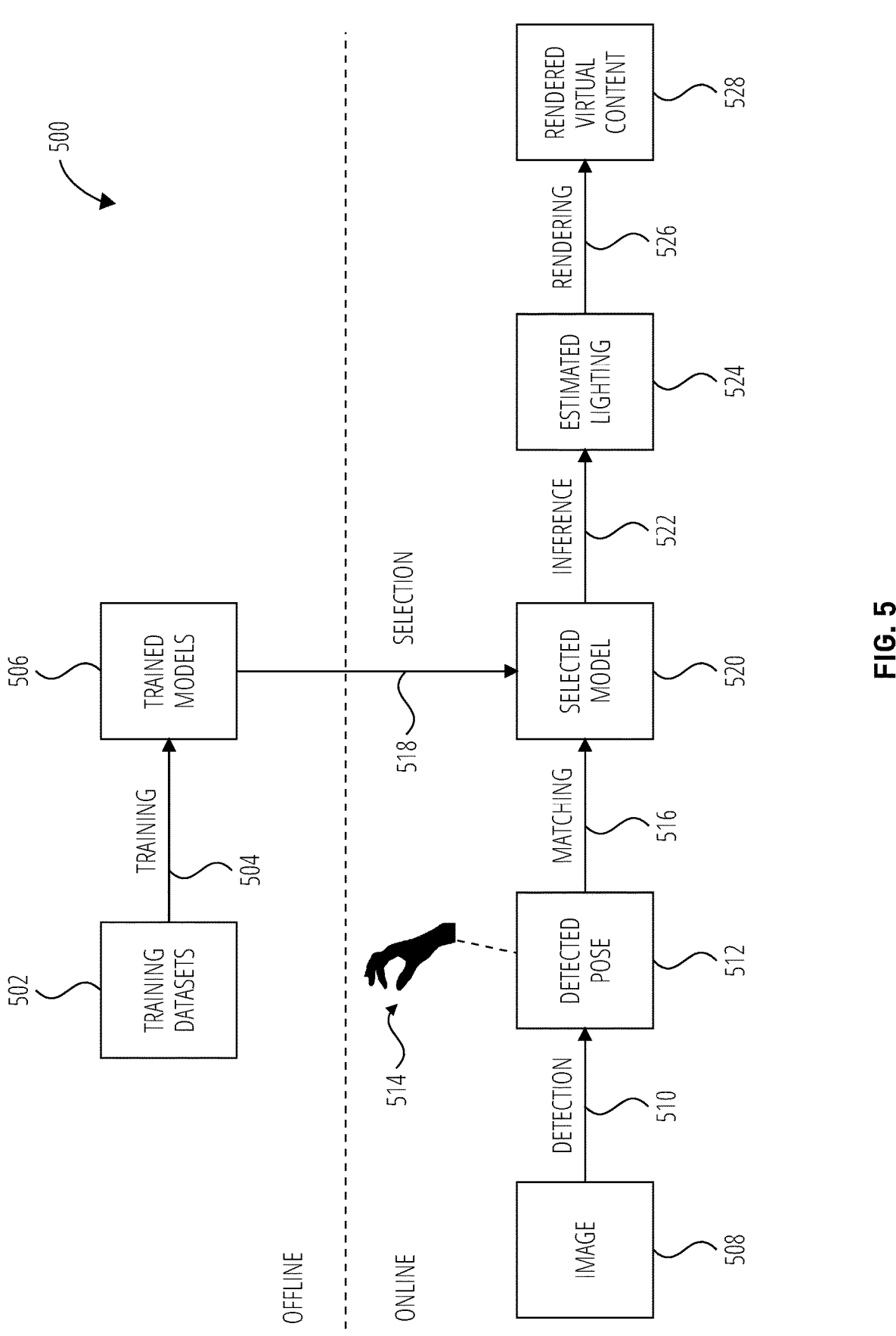
FIG. 5 diagrammatically illustrates both an offline phase and an online phase of a light estimation facilitation process, wherein the offline phase includes training multiple machine learning models and the online phase includes using at least one of the machine learning models to obtain estimated illumination parameter values for rendering virtual content, according to some examples.

FIG. 5 is a diagram 500 of an offline phase and an online phase of a light estimation facilitation process. The offline phase includes the training of multiple machine learning models. The online phase includes using at least one of the machine learning models to obtain estimated illumination parameter values for rendering virtual content. Certain operations depicted in the diagram 500 may be performed by an XR device such as the XR device 110 of FIG. 1. The XR device 110 is thus referred to below as a non-limiting example to illustrate such operations.

Referring firstly to the offline phase, training datasets 502 are obtained for each machine learning model to be trained. In the case of FIG. 5, the machine learning models are CNNs, with one CNN being trained per hand gesture.

To obtain a training dataset for a particular hand gesture, images of hands in that hand gesture are captured or generated. A synthetic image generator may be executed at the server 112 to obtain synthetic image data. For example, a tool such as Unreal Engine™ can be leveraged to generate realistic scenes of human hands in various lighting conditions, including complex indoor and outdoor scenes with varying illumination.

For example, images might include hands in different orientations under sunlight, fluorescent lights, and shadows, providing a diverse training base. Images may be converted from panorama images (e.g., panorama images used to illuminate synthetic hand models) to spherical harmonics data for compact representation.

As a result, each of the training datasets 502 obtains images of hands depicting a respective hand gesture and lighting information for a CNN to learn from. For instance, a training dataset may include training pairs, with each pair being an image of a hand and its corresponding spherical harmonics coefficients (e.g., computed from panorama images used for lighting a hand in a synthetic manner). When it comes to hand gestures, for example, five or ten commonly used hand gestures can be selected (e.g., those that are most often used for user interaction with the XR device 110), with a respective training dataset being generated for each hand gesture. Each training dataset is then stored in association with its corresponding hand gesture.

Once the training datasets 502 are ready, training 504 is performed (e.g., at the server 112) to obtain trained models 506. The trained models 506 include a trained CNN for each selected hand gesture. Each CNN is fitted to the relevant training data set in a supervised learning process. Accordingly, each trained CNN is capable of estimating values of illumination parameters when provided with an image of a hand in the gesture it was trained on.

During training, a CNN learns patterns in how light interacts with hands. For instance, a CNN might learn to recognize the subtle differences in shadow and light intensity that indicate a light source's direction. The trained models 506 are stored for use during the online phase, locally at the XR device 110 or accessible to the XR device 110 via the server 112.

Turning now to the online phase, a process may commence with the capturing of an image 508 by the XR device 110. The XR device 110 performs detection 510 to identify the pose of the hand (e.g., the pose of a right hand of the user 106 who is wearing the XR device 110). Once the pose has been detected, the XR device 110 automatically performs matching 516 to match the detected pose 512 with one of the trained models 506.

For example, the XR device 110 checks data in the storage component 208 to find an identifier of the model corresponding to the detected pose 512 (e.g., a hand gesture 514 is detected as being a pinching hand gesture as shown in FIG. 5, and the XR device 110 locates the CNN that was trained on pinching hand gesture images). Selection 518 is then performed based on the matching 516 of the detected pose 512 with the selected model 520. In this way, the XR device 110 automatically selects a selected model 520 from among the trained models 506 that may be the most accurate in the circumstances.

The XR device 110 (or the server 112) then performs inference 522. During inference 522, the image 508, or part thereof, is processed using the selected model 520 to obtain output data that includes estimated illumination parameter values. The output data is shown as estimated lighting 524 in FIG. 5.

During inference 522, the trained CNN applies its learned parameters to the specific features of the image 508 to generate values for a set of lighting parameters. These parameters may include the direction, intensity, and color temperature of the light sources affecting the hand. For example, if the XR device 110 detects a hand pose that is open and facing upwards, the selected model 520, which has been trained on similar poses, will analyze the shading and highlights present on the hand's surface. By analyzing these visual cues, the selected model 520 infers the most likely lighting conditions, such as a strong light source above and slightly in front of the hand.

Referring now to the estimated lighting 524, the output data provides an estimation of the lighting conditions, e.g., represented as a set of spherical harmonics coefficients. Spherical harmonics offer a mathematically efficient way to describe the intensity and directionality of light within a scene, encapsulating complex lighting environments with a relatively small set of coefficients. This compact representation is particularly useful for real-time applications, such as XR, where computational efficiency may be desirable.

During rendering 526, the XR device 110 applies the estimated lighting 524 to create rendered virtual content 528 with lighting that matches the real-world environment 102. Utilizing the estimated lighting conditions, the XR device 110 dynamically adjusts the lighting of virtual content to ensure it aligns with the real-world environment 102.

For example, the rendering component 310 and/or the graphical processing unit 228 calculates the appropriate shading and shadows for each virtual object based on the spherical harmonics representation of the scene's lighting. This process might include adjusting aspects of the object's materials, modifying shadow softness and direction, or altering the object's color temperature to match the ambient light. In some examples, during rendering 526, the normal vector of points on an object's surface are used with spherical harmonics values to approximate how much light from the environment hits the point, allowing for efficient and visually plausible lighting calculations.

Figure 6:
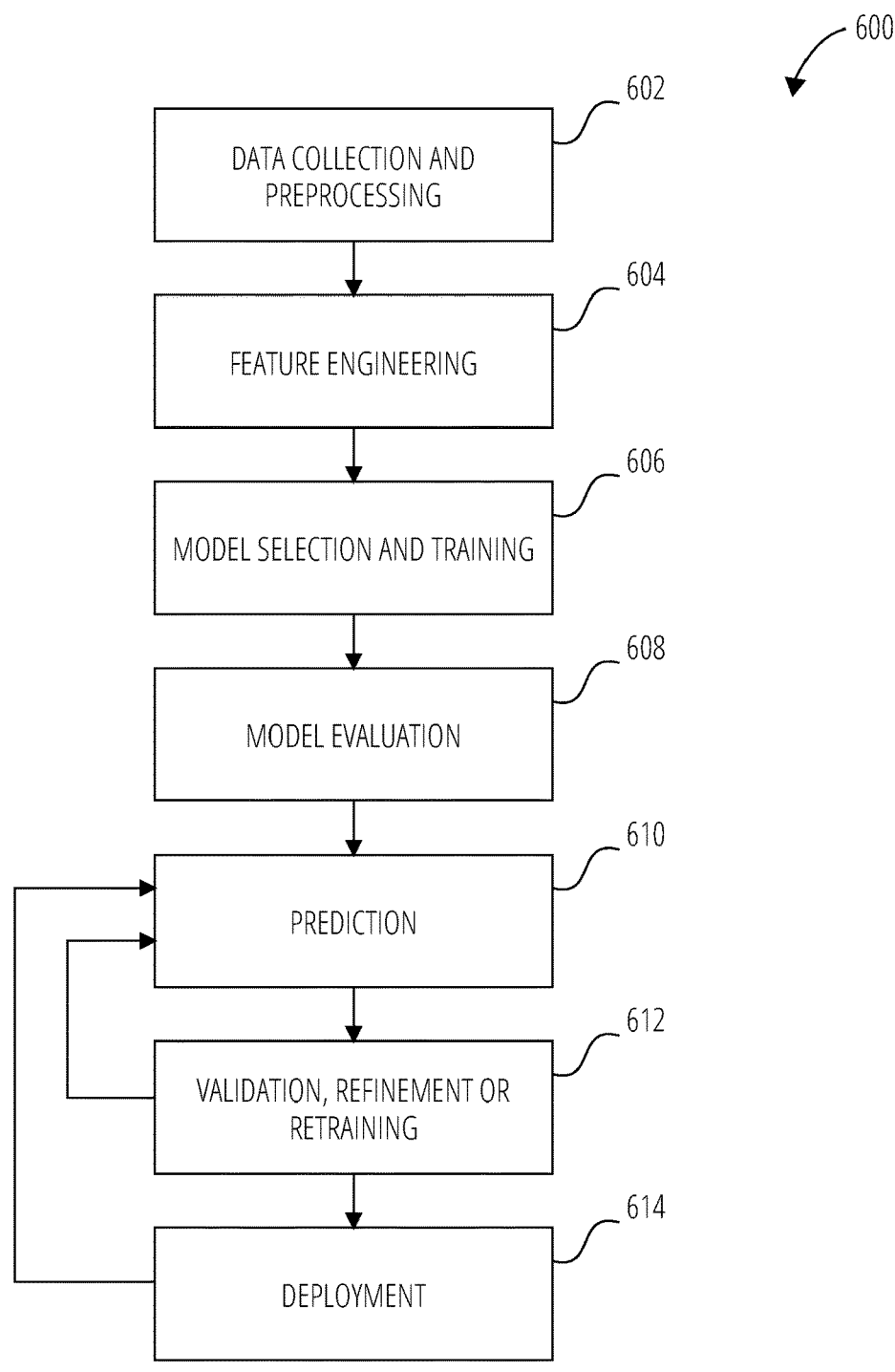
FIG. 6 diagrammatically illustrates a machine learning pipeline, according to some examples.

FIG. 6 is a flowchart depicting a machine learning pipeline 600, according to some examples. The machine learning pipeline 600 may be used to generate a trained model, for example, the trained machine learning program 702 shown in the diagram 700 of FIG. 7.

Broadly, machine learning may involve using computer algorithms to automatically learn patterns and relationships in data, potentially without the need for explicit programming. Machine learning algorithms may be divided into three main categories: supervised learning, unsupervised learning, and reinforcement learning.

Supervised learning involves training a model using labeled data to predict an output for new, unseen inputs. Examples of supervised learning algorithms may include linear regression, decision trees, and neural networks.

Unsupervised learning involves training a model on unlabeled data to find hidden patterns and relationships in the data. Examples of unsupervised learning algorithms may include clustering, principal component analysis, and generative models, such as autoencoders.

Reinforcement learning involves training a model to make decisions in a dynamic environment by receiving feedback in the form of rewards or penalties. Examples of reinforcement learning algorithms may include Q-learning and policy gradient methods.

Examples of specific machine learning algorithms that may be deployed, according to some examples, include logistic regression, which is a type of supervised learning algorithm used for binary classification tasks. Logistic regression models the probability of a binary response variable based on one or more predictor variables. Another example type of machine learning algorithm is Naïve Bayes, which is a supervised learning algorithm used for classification tasks. Naïve Bayes is based on Bayes' theorem and assumes that the predictor variables are independent of each other. Random Forest is another type of supervised learning algorithm used for classification, regression, and other tasks. Random Forest builds a collection of decision trees and combines their outputs to make predictions. Further examples include neural networks, which consist of interconnected layers of nodes (or neurons) that process information and make predictions based on the input data. Matrix factorization is another type of machine learning algorithm used for recommender systems and other tasks. Matrix factorization decomposes a matrix into two or more matrices to uncover hidden patterns or relationships in the data. SVMs are a type of supervised learning algorithm used for classification, regression, and other tasks. SVM finds a hyperplane that separates the different classes in the data. Other types of machine learning algorithms may include decision trees, k-nearest neighbors, clustering algorithms, and deep learning algorithms, such as CNNs, recurrent neural networks (RNNs), and transformer models. The choice of algorithm may depend on the nature of the data, the complexity of the problem, and the performance requirements of the application.

The performance of machine learning models may be evaluated on a separate test set of data that was not used during training to ensure that the model can generalize to new, unseen data.

Although several specific examples of machine learning algorithms/models are discussed herein, the principles discussed herein can be applied to other machine learning algorithms/models as well. Deep learning algorithms such as convolutional neural networks, recurrent neural networks, and transformers, as well as more traditional machine learning algorithms like decision trees, random forests, and gradient boosting may be used in various machine learning applications.

Two example types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

Generating a trained machine learning program 702 may include multiple phases that form part of the machine learning pipeline 600, including for example the following phases illustrated in FIG. 6:

Data collection and preprocessing 602: This phase may include acquiring and cleaning data to ensure that it is suitable for use in the machine learning model. This phase may also include removing duplicates, handling missing values, and converting data into a suitable format.

Feature engineering 604: This phase may include selecting and transforming the training data 706 to create features that are useful for predicting the target variable. Feature engineering may include (1) receiving features 708 (e.g., as structured or labeled data in supervised learning) and/or (2) identifying features 708 (e.g., unstructured or unlabeled data for unsupervised learning) in training data 706.

Model selection and training 606: This phase may include selecting an appropriate machine learning algorithm and training it on the preprocessed data. This phase may further involve splitting the data into training and testing sets, using cross-validation to evaluate the model, and tuning hyperparameters to improve performance.

Model evaluation 608: This phase may include evaluating the performance of a trained model (e.g., the trained machine learning program 702) on a separate testing dataset. This phase can help determine if the model is overfitting or underfitting and determine whether the model is suitable for deployment.

Prediction 610: This phase involves using a trained model (e.g., trained machine learning program 702) to generate predictions on new, unseen data.

Validation, refinement or retraining 612: This phase may include updating a model based on feedback generated from the prediction phase, such as new data or user feedback.

Deployment 614: This phase may include integrating the trained model (e.g., the trained machine learning program 702) into a more extensive system or application, such as a web service, mobile app, an XR device, or Internet of Things (IoT) device. This phase can involve setting up APIs, building a user interface, and ensuring that the model is scalable and can handle large volumes of data.

Figure 7:
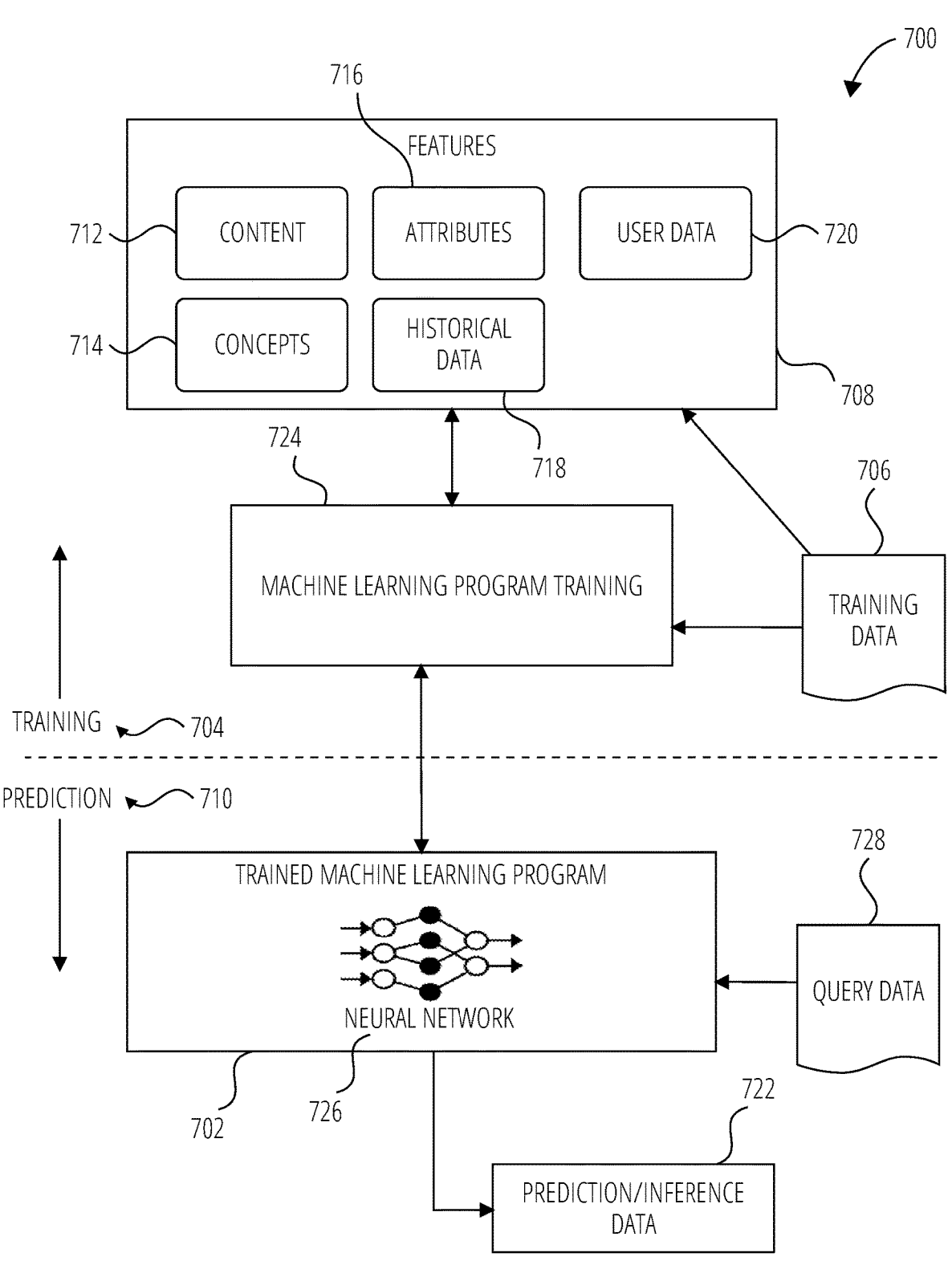
FIG. 7 diagrammatically illustrates training and use of a machine learning program, according to some examples.

FIG. 7 illustrates further details of two example phases, namely a training phase 704 (e.g., part of model selection and training 606) and a prediction phase 710 (part of prediction 610). Prior to the training phase 704, feature engineering 604 is used to identify features 708. This may include identifying informative, discriminating, and independent features for effectively operating the trained machine learning program 702 in pattern recognition, classification, and regression. In some examples, the training data 706 includes labeled data, known for pre-identified features 708 and one or more outcomes. Each of the features 708 may be a variable or attribute, such as an individual measurable property of a process, article, system, or phenomenon represented by a data set (e.g., the training data 706). Features 708 may also be of different types, such as numeric features, strings, and graphs, and may include one or more of content 712, concepts 714, attributes 716, historical data 718, and/or user data 720, merely for example.

In training phase 704, the machine learning program may use the training data 706 to find correlations among the features 708 that affect a predicted outcome or prediction/ inference data 722. With the training data 706 and the identified features 708, the trained machine learning program 702 is trained during the training phase 704 during machine learning program training 724. The machine learning program training 724 appraises values of the features 708 as they correlate to the training data 706. The result of the training is the trained machine learning program 702 (e.g., a trained or learned model).

Further, the training phase 704 may involve machine learning, in which the training data 706 is structured (e.g., labeled during preprocessing operations). The trained machine learning program 702 may implement a neural network 726 capable of performing, for example, classification or clustering operations. In other examples, the training phase 704 may involve deep learning, in which the training data 706 is unstructured, and the trained machine learning program 702 implements a deep neural network 726 that can perform both feature extraction and classification/clustering operations.

In some examples, a neural network 726 may be generated during the training phase 704, and implemented within the trained machine learning program 702. The neural network 726 includes a hierarchical (e.g., layered) organization of neurons, with each layer consisting of multiple neurons or nodes. Neurons in the input layer receive the input data, while neurons in the output layer produce the final output of the network. Between the input and output layers, there may be one or more hidden layers, each consisting of multiple neurons.

Each neuron in the neural network 726 may operationally compute a function, such as an activation function, which takes as input the weighted sum of the outputs of the neurons in the previous layer, as well as a bias term. The output of this function is then passed as input to the neurons in the next layer. If the output of the activation function exceeds a certain threshold, an output is communicated from that neuron (e.g., transmitting neuron) to a connected neuron (e.g., receiving neuron) in successive layers. The connections between neurons have associated weights, which define the influence of the input from a transmitting neuron to a receiving neuron. During the training phase, these weights are adjusted by the learning algorithm to optimize the performance of the network. Different types of neural networks may use different activation functions and learning algorithms, affecting their performance on different tasks. The layered organization of neurons and the use of activation functions and weights enable neural networks to model complex relationships between inputs and outputs, and to generalize to new inputs that were not seen during training.

In some examples, the neural network 726 may also be one of several different types of neural networks, such as a single-layer feed-forward network, a Multilayer Perceptron (MLP), an Artificial Neural Network (ANN), a RNN, a Long Short-Term Memory Network (LSTM), a Bidirectional Neural Network, a symmetrically connected neural network, a Deep Belief Network (DBN), a CNN, a Generative Adversarial Network (GAN), an Autoencoder Neural Network (AE), a Restricted Boltzmann Machine (RBM), a Hopfield Network, a Self-Organizing Map (SOM), a Radial Basis Function Network (RBFN), a Spiking Neural Network (SNN), a Liquid State Machine (LSM), an Echo State Network (ESN), a Neural Turing Machine (NTM), or a Transformer Network, merely for example.

In addition to the training phase 704, a validation phase may be performed on a separate dataset known as the validation dataset. The validation dataset is used to tune the hyperparameters of a model, such as the learning rate and the regularization parameter. The hyperparameters are adjusted to improve the model's performance on the validation dataset.

Once a model is fully trained and validated, in a testing phase, the model may be tested on a new dataset. The testing dataset is used to evaluate the model's performance and ensure that the model has not overfitted the training data.

In the prediction phase 710, the trained machine learning program 702 uses the features 708 for analyzing query data 728 to generate inferences, outcomes, or predictions, as examples of a prediction/inference data 722. For example, during prediction phase 710, the trained machine learning program 702 generates an output. Query data 728 is provided as an input to the trained machine learning program 702, and the trained machine learning program 702 generates the prediction/inference data 722 as output, responsive to receipt of the query data 728.

In some examples, the trained machine learning program 702 may be a generative artificial intelligence (AI) model. Generative AI is a term that may refer to any type of artificial intelligence that can create new content. For example, generative AI can produce text, images, video, audio, code, or synthetic data. In some examples, the generated content may be similar to the original data, but not identical.

Some of the techniques that may be used in generative AI are:

CNNs: CNNs may be used for image recognition and computer vision tasks. CNNs may, for example, be designed to extract features from images by using filters or kernels that scan the input image and highlight important patterns.

RNNs: RNNs may be used for processing sequential data, such as speech, text, and time series data, for example. RNNs employ feedback loops that allow them to capture temporal dependencies and remember past inputs.

GANs: GANs may include two neural networks: a generator and a discriminator. The generator network attempts to create realistic content that can "fool" the discriminator network, while the discriminator network attempts to distinguish between real and fake content. The generator and discriminator networks compete with each other and improve over time.

Variational autoencoders (VAEs): VAEs may encode input data into a latent space (e.g., a compressed representation) and then decode it back into output data. The latent space can be manipulated to generate new variations of the output data. VAEs may use self-attention mechanisms to process input data, allowing them to handle long text sequences and capture complex dependencies.

Transformer models: Transformer models may use attention mechanisms to learn the relationships between different parts of input data (such as words or pixels) and generate output data based on these relationships. Transformer models can handle sequential data, such as text or speech, as well as non-sequential data, such as images or code.

In generative AI examples, the prediction/inference data 722 may include predictions, estimates, translations, summaries, answers, media content, or combinations thereof.

Figure 8:
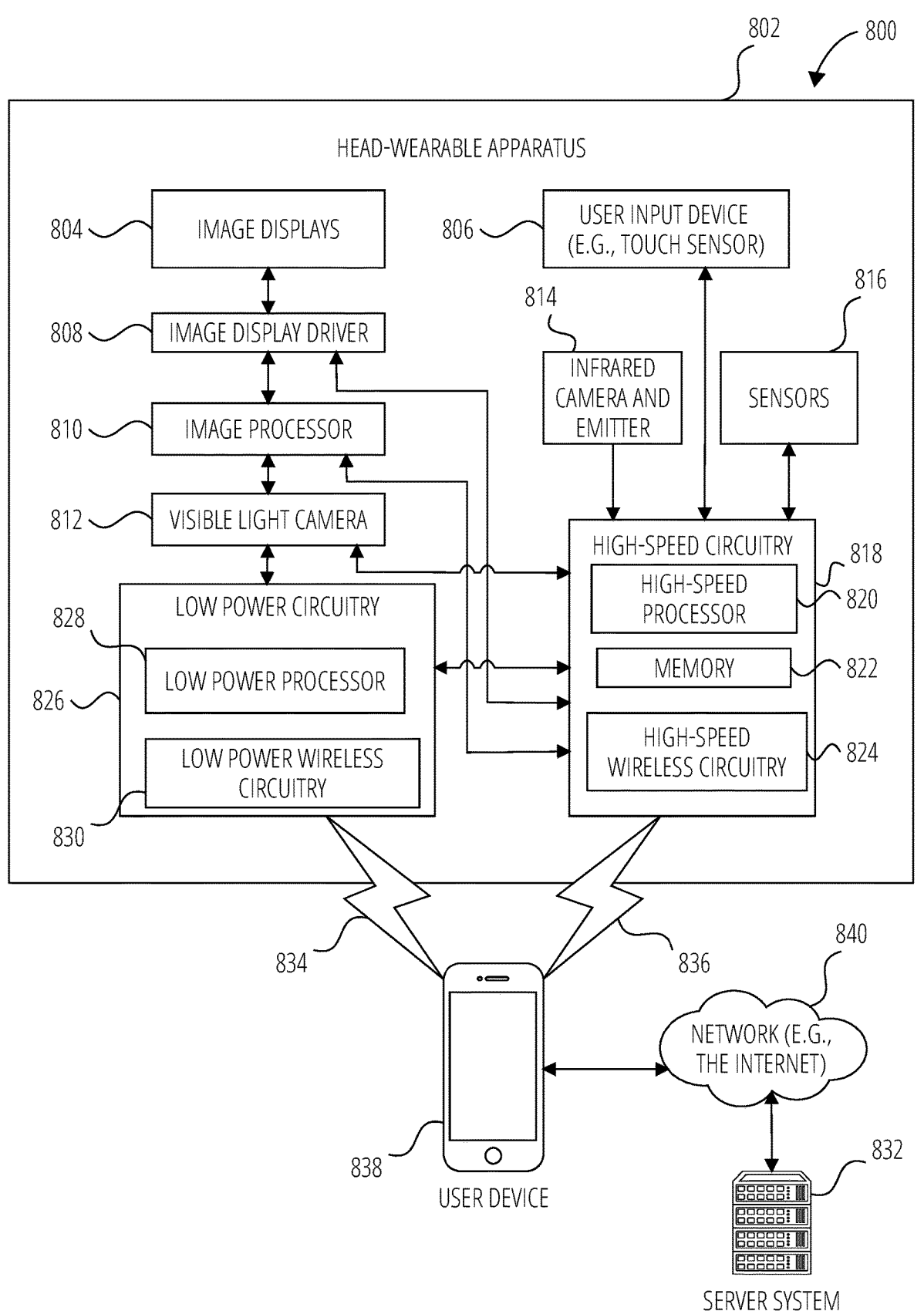
FIG. 8 illustrates a network environment in which a head-wearable apparatus can be implemented, according to some examples.

FIG. 8 illustrates a network environment 800 in which a head-wearable apparatus 802, such as a head-wearable XR device, can be implemented according to some examples. FIG. 8 provides a high-level functional block diagram of an example head-wearable apparatus 802 communicatively coupled a user device 838 and a server system 832 via a suitable network 840. One or more of the techniques described herein may be performed using the head-wearable apparatus 802 or a network of devices similar to those shown in FIG. 8.

The head-wearable apparatus 802 includes a camera, such as at least one of a visible light camera 812 and an infrared camera and emitter 814. The head-wearable apparatus 802 includes other sensors 816, such as motion sensors or eye tracking sensors. The user device 838 can be capable of connecting with head-wearable apparatus 802 using both a communication link 834 and a communication link 836. The user device 838 is connected to the server system 832 via the network 840. The network 840 may include any combination of wired and wireless connections.

The head-wearable apparatus 802 includes a display arrangement that has several components. For example, the arrangement includes two image displays 804 of an optical assembly. The two displays may include one associated with the left lateral side and one associated with the right lateral side of the head-wearable apparatus 802. The head-wearable apparatus 802 also includes an image display driver 808, an image processor 810, low power circuitry 826, and high-speed circuitry 818. The image displays 804 are for presenting images and videos, including an image that can provide a graphical user interface to a user of the head-wearable apparatus 802.

The image display driver 808 commands and controls the image display of each of the image displays 804. The image display driver 808 may deliver image data directly to each image display of the image displays 804 for presentation or may have to convert the image data into a signal or data format suitable for delivery to each image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

The head-wearable apparatus 802 may include a frame and stems (or temples) extending from a lateral side of the frame, or another component (e.g., a head strap) to facilitate wearing of the head-wearable apparatus 802 by a user. The head-wearable apparatus 802 of FIG. 8 further includes a user input device 806 (e.g., touch sensor or push button) including an input surface on the head-wearable apparatus 802. The user input device 806 is configured to receive, from the user, an input selection to manipulate the graphical user interface of the presented image.

At least some components shown in FIG. 8 for the head-wearable apparatus 802 are located on one or more circuit boards, for example a printed circuit board (PCB) or flexible PCB, in the head-wearable apparatus 802. Depicted components can be located in frames, chunks, hinges, or bridges of the head-wearable apparatus 802, for example. Left and right sides of the head-wearable apparatus 802 may each include a digital camera element such as a complementary metal-oxide-semiconductor (CMOS) image sensor, charge coupled device, a camera lens, or any other respective visible or light capturing elements that may be used to capture data, including images of scenes with unknown objects.

The head-wearable apparatus 802 includes a memory 822 which stores instructions to perform a subset or all of the functions described herein. The memory 822 can also include a storage device. As further shown in FIG. 8, the high-speed circuitry 818 includes a high-speed processor 820, the memory 822, and high-speed wireless circuitry 824. In FIG. 8, the image display driver 808 is coupled to the high-speed circuitry 818 and operated by the high-speed processor 820 in order to drive the left and right image displays of the image displays 804. The high-speed processor 820 may be any processor capable of managing high-speed communications and operation of any general computing system needed for the head-wearable apparatus 802. The high-speed processor 820 includes processing resources needed for managing high-speed data transfers over the communication link 836 to a wireless local area network (WLAN) using high-speed wireless circuitry 824. In certain examples, the high-speed processor 820 executes an operating system such as a LINUX operating system or other such operating system of the head-wearable apparatus 802 and the operating system is stored in memory 822 for execution. In addition to any other responsibilities, the high-speed processor 820 executing a software architecture for the head-wearable apparatus 802 is used to manage data transfers with high-speed wireless circuitry 824. In certain examples, high-speed wireless circuitry 824 is configured to implement Institute of Electrical and Electronic Engineers (IEEE) 802.11 communication standards, also referred to herein as Wi-Fi™. In other examples, other high-speed communications standards may be implemented by high-speed wireless circuitry 824.

The low power wireless circuitry 830 and the high-speed wireless circuitry 824 of the head-wearable apparatus 802 can include short range transceivers (Bluetooth™) and wireless wide, local, or wide area network transceivers (e.g., cellular or Wi-Fi™). The user device 838, including the transceivers communicating via the communication link 834 and communication link 836, may be implemented using details of the architecture of the head-wearable apparatus 802, as can other elements of the network 840.

The memory 822 may include any storage device capable of storing various data and applications, including, among other things, camera data generated by the visible light camera 812, sensors 816, and the image processor 810, as well as images generated for display by the image display driver 808 on the image displays of the image displays 804. While the memory 822 is shown as integrated with the high-speed circuitry 818, in other examples, the memory 822 may be an independent standalone element of the head-wearable apparatus 802. In certain such examples, electrical routing lines may provide a connection through a chip that includes the high-speed processor 820 from the image processor 810 or low power processor 828 to the memory 822. In other examples, the high-speed processor 820 may manage addressing of memory 822 such that the low power processor 828 will boot the high-speed processor 820 any time that a read or write operation involving memory 822 is needed.

As shown in FIG. 8, the low power processor 828 or high-speed processor 820 of the head-wearable apparatus 802 can be coupled to the camera (visible light camera 812, or infrared camera and emitter 814), the image display driver 808, the user input device 806 (e.g., touch sensor or push button), and the memory 822. The head-wearable apparatus 802 also includes sensors 816, which may be the motion components 1034, position components 1038, environmental components 1036, and biometric components 1032, e.g., as described below with reference to FIG. 10. In particular, motion components 1034 and position components 1038 are used by the head-wearable apparatus 802 to determine and keep track of the position and orientation (the "pose") of the head-wearable apparatus 802 relative to a frame of reference or another object, in conjunction with a video feed from one of the visible light cameras 812, using for example techniques such as structure from motion (SfM) or VIO.

In some examples, and as shown in FIG. 8, the head-wearable apparatus 802 is connected with a host computer. For example, the head-wearable apparatus 802 is paired with the user device 838 via the communication link 836 or connected to the server system 832 via the network 840. The server system 832 may be one or more computing devices as part of a service or network computing system, for example, that include a processor, a memory, and network communication interface to communicate over the network 840 with the user device 838 and head-wearable apparatus 802.

The user device 838 includes a processor and a network communication interface coupled to the processor. The network communication interface allows for communication over the network 840, communication link 834 or communication link 836. The user device 838 can further store at least portions of the instructions for implementing functionality described herein.

Output components of the head-wearable apparatus 802 include visual components, such as a display (e.g., one or more liquid-crystal display (LCD)), one or more plasma display panel (PDP), one or more light emitting diode (LED) display, one or more projector, or one or more waveguide. The image displays 804 described above are examples of such a display. In some examples, the image displays 804 of the optical assembly are driven by the image display driver 808.

The output components of the head-wearable apparatus 802 may further include acoustic components (e.g., speakers), haptic components (e.g., a vibratory motor), other signal generators, and so forth. The input components of the head-wearable apparatus 802, the user device 838, and server system 832, such as the user input device 806, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 802 may optionally include additional peripheral device elements. Such peripheral device elements may include biometric sensors, additional sensors, or display elements integrated with the head-wearable apparatus 802. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi™ or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over a communication link 836 from the user device 838 via the low power wireless circuitry 830 or high-speed wireless circuitry 824.

FIG. 9 is a block diagram 900 illustrating a software architecture 904, which can be installed on one or more of the devices described herein, according to some examples. The software architecture 904 is supported by hardware such as a machine 902 that includes processors 920, memory 926, and I/O components 938. In this example, the software architecture 904 can be conceptualized as a stack of layers, where each layer provides a particular functionality. The software architecture 904 includes layers such as an operating system 912, libraries 910, frameworks 908, and applications 906. Operationally, the applications 906 invoke API calls 950, through the software stack and receive messages 952 in response to the API calls 950.

The operating system 912 manages hardware resources and provides common services. The operating system 912 includes, for example, a kernel 914, services 916, and drivers 922. The kernel 914 acts as an abstraction layer between the hardware and the other software layers. For example, the kernel 914 provides memory management, processor management (e.g., scheduling), component management, networking, and security settings, among other functionality. The services 916 can provide other common services for the other software layers. The drivers 922 are responsible for controlling or interfacing with the underlying hardware. For instance, the drivers 922 can include display drivers, camera drivers, Bluetooth™ or Bluetooth™ Low Energy drivers, flash memory drivers, serial communication drivers (e.g., Universal Serial Bus (USB) drivers), Wi-Fi™ drivers, audio drivers, power management drivers, and so forth.

The libraries 910 provide a low-level common infrastructure used by the applications 906. The libraries 910 can include system libraries 918 (e.g., C standard library) that provide functions such as memory allocation functions, string manipulation functions, mathematic functions, and the like. In addition, the libraries 910 can include API libraries 924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and 3D in a graphic content on a display), database libraries (e.g., SQLite to provide various relational database functions), web libraries (e.g., WebKit to provide web browsing functionality), and the like. The libraries 910 can also include a wide variety of other libraries 928 to provide many other APIs to the applications 906.

The frameworks 908 provide a high-level common infrastructure that is used by the applications 906. For example, the frameworks 908 provide various graphical user interface (GUI) functions, high-level resource management, and high-level location services. The frameworks 908 can provide a broad spectrum of other APIs that can be used by the applications 906, some of which may be specific to a particular operating system or platform.

In some examples, the applications 906 may include a home application 936, a contacts application 930, a browser application 932, a book reader application 934, a location application 942, a media application 944, a messaging application 946, a game application 948, and a broad assortment of other applications such as a third-party application 940. In some examples, the applications 906 are programs that execute functions defined in the programs. Various programming languages can be employed to create one or more of the applications 906, structured in a variety of manners, such as object-oriented programming languages (e.g., Objective-C, Java, or C++) or procedural programming languages (e.g., C or assembly language). In some examples, the third-party application 940 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In FIG. 9, the third-party application 940 can invoke the API calls 950 provided by the operating system 912 to facilitate functionality described herein. The applications 906 may include an AR application such as the AR application 224 described herein, according to some examples.

Figure 10:
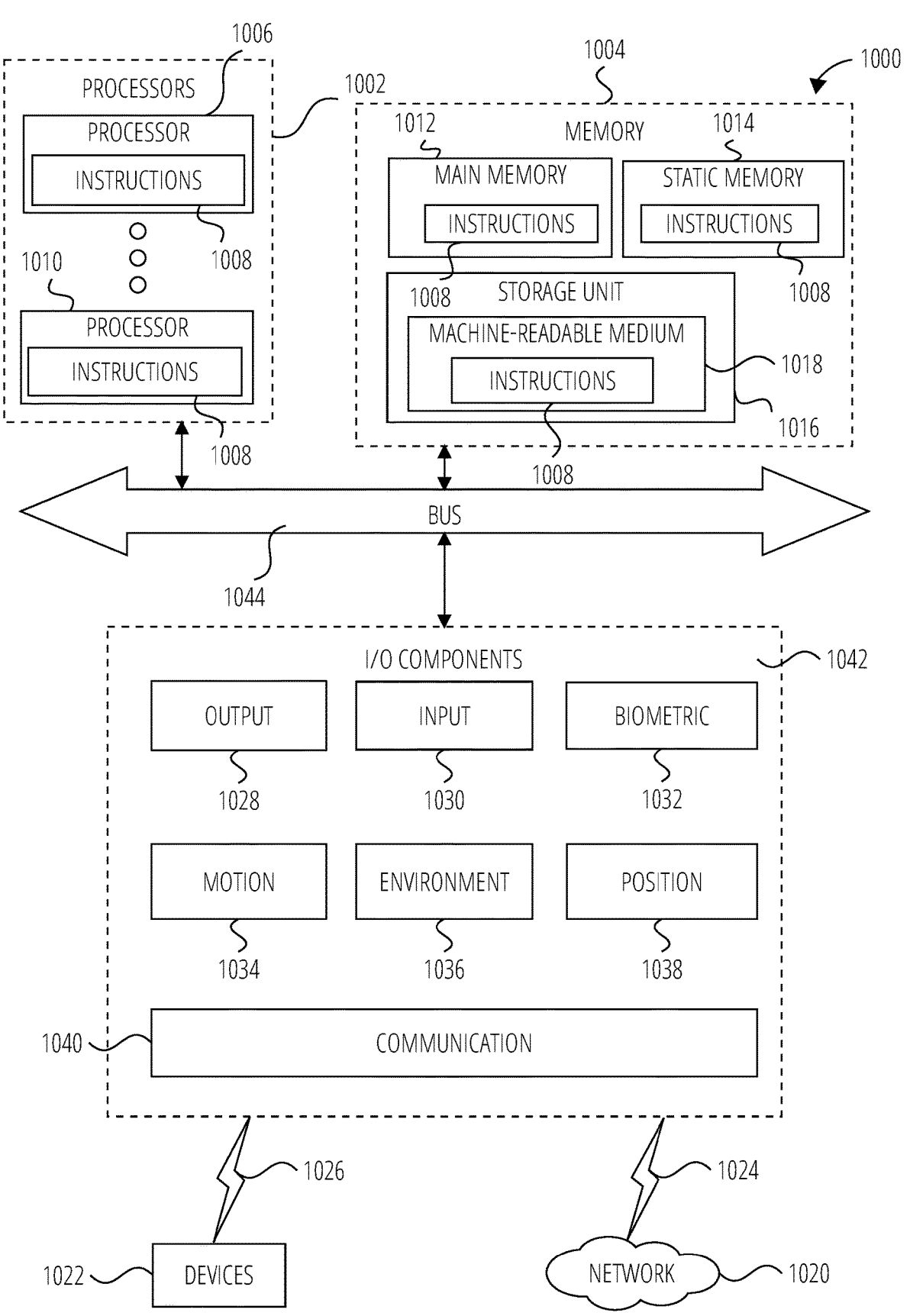
FIG. 10 is a diagrammatic representation of a machine in the form of a computer system within which a set of instructions may be executed for causing the machine to perform any one or more of the methodologies discussed herein, according to some examples.

FIG. 10 is a diagrammatic representation of a machine 1000 within which instructions 1008 (e.g., software, a program, an application, an applet, an app, or other executable code) for causing the machine 1000 to perform any one or more of the methodologies discussed herein may be executed, according to some examples. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines.

In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), XR device, a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein.

The machine 1000 may include processors 1002, memory 1004, and I/O components 1042, which may be configured to communicate with each other via a bus 1044. In some examples, the processors 1002 may include, for example, a processor 1006 and a processor 1010 that execute the instructions 1008. Although FIG. 10 shows multiple processors 1002, the machine 1000 may include a single processor with a single core, a single processor with multiple cores (e.g., a multi-core processor), multiple processors with a single core, multiple processors with multiples cores, or any combination thereof.

The memory 1004 includes a main memory 1012, a static memory 1014, and a storage unit 1016, accessible to the processors via the bus 1044. The main memory 1004, the static memory 1014, and storage unit 1016 store the instructions 1008 embodying any one or more of the methodologies or functions described herein. The instructions 1008 may also reside, completely or partially, within the main memory 1012, within the static memory 1014, within machine-readable medium 1018 within the storage unit 1016, within at least one of the processors, or any suitable combination thereof, during execution thereof by the machine 1000.

The I/O components 1042 may include a wide variety of components to receive input, provide output, produce output, transmit information, exchange information, capture measurements, and so on. The specific I/O components 1042 that are included in a particular machine will depend on the type of machine. For example, portable machines such as mobile phones may include a touch input device or other such input mechanisms, while a headless server machine will likely not include such a touch input device. It will be appreciated that the I/O components 1042 may include many other components that are not shown in FIG. 10. In various examples, the I/O components 1042 may include output components 1028 and input components 1030. The output components 1028 may include visual components (e.g., a display such as a plasma display panel (PDP), a light emitting diode (LED) display, a LCD, a projector, or a cathode ray tube (CRT)), acoustic components (e.g., speakers), haptic components (e.g., a vibratory motor, resistance mechanisms), other signal generators, and so forth. The input components 1030 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In some examples, the I/O components 1042 may include biometric components 1032, motion components 1034, environmental components 1036, or position components 1038, among a wide array of other components. For example, the biometric components 1032 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1034 include acceleration sensor components (e.g., accelerometer), gravitation sensor components, rotation sensor components (e.g., gyroscope), and so forth. The environmental components 1036 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 include location sensor components (e.g., a GPS receiver components), altitude sensor components (e.g., altimeters or barometers that detect air pressure from which altitude may be derived), orientation sensor components (e.g., magnetometers), and the like.

Any biometric data collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

Communication may be implemented using a wide variety of technologies. The I/O components 1042 further include communication components 1040 operable to couple the machine 1000 to a network 1020 or devices 1022 via a coupling 1024 and a coupling 1026, respectively. For example, the communication components 1040 may include a network interface component or another suitable device to interface with the network 1020. In further examples, the communication components 1040 may include wired communication components, wireless communication components, cellular communication components, Near Field Communication (NFC) components, Bluetooth™ components, Wi-Fi™ components, and other communication components to provide communication via other modalities. The devices 1022 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an image sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geolocation, location via Wi-Fi™ signal triangulation, location via detecting an NFC beacon signal that may indicate a particular location, and so forth.

The various memories (e.g., memory 1004, main memory 1012, static memory 1014, and/or memory of the processors 1002) and/or storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed examples.

The instructions 1008 may be transmitted or received over the network 1020, using a transmission medium, via a network interface device (e.g., a network interface component included in the communication components 1040) and using any one of a number of well-known transfer protocols (e.g., hypertext transfer protocol (HTTP)). Similarly, the instructions 1008 may be transmitted or received using a transmission medium via the coupling 1026 (e.g., a peer-to-peer coupling) to the devices 1022.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks.

The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

CONCLUSION

Although aspects have been described with reference to specific examples, it will be evident that various modifications and changes may be made to these examples without departing from the broader scope of the present disclosure. Accordingly, the specification and drawings are to be regarded in an illustrative rather than a restrictive sense. The accompanying drawings that form a part hereof, show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

As used herein, the term "processor" may refer to any one or more circuits or virtual circuits (e.g., a physical circuit emulated by logic executing on an actual processor) that manipulates data values according to control signals (e.g., commands, opcodes, machine code, control words, macro-instructions, etc.) and which produces corresponding output signals that are applied to operate a machine. A processor may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), an FPGA, a Radio-Frequency Integrated Circuit (RFIC), a Neuromorphic Processor, a Quantum Processor, or any combination thereof. A processor may be a multi-core processor having two or more independent processors (sometimes referred to as "cores") that may execute instructions contemporaneously. Multi-core processors may contain multiple computational cores on a single integrated circuit die, each of which can independently execute program instructions in parallel. Parallel processing on multi-core processors may be implemented via architectures like superscalar, Very Long Instruction Word (VLIW), vector processing, or Single Instruction, Multiple Data (SIMD) that allow each core to run separate instruction streams concurrently. A processor may be emulated in software, running on a physical processor, as a virtual processor or virtual circuit. The virtual processor may behave like an independent processor but is implemented in software rather than hardware.

Unless the context clearly requires otherwise, in the present disclosure, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

The various features, steps, operations, and processes described herein may be used independently of one another, or may be combined in various ways. All possible combinations and subcombinations are intended to fall within the scope of this disclosure. In addition, certain method or process blocks or operations may be omitted in some implementations.

Although some examples, such as those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in examples for the purpose of streamlining the disclosure. This method of disclosure is not to be interpreted as reflecting an intention that the examples require more features than are expressly recited in each claim. Rather, inventive subject matter may reside in less than all features of a single disclosed example.

EXAMPLES

In view of the above-described implementations of subject matter this application discloses the following list of examples, wherein one feature of an example in isolation, or more than one feature of an example taken in combination, and, optionally, in combination with one or more features of one or more further examples, are further examples also falling within the disclosure of this application.

Example 1 is a method comprising: obtaining, via an image sensor of an extended reality (XR) device, an image of a hand in a real-world environment; processing at least part of the image to detect a pose of the hand; selecting, based on the detected pose, a machine learning model from among a plurality of machine learning models; processing at least part of the image via the machine learning model to obtain estimated illumination parameter values associated with the hand; and using the estimated illumination parameter values to render virtual content to be presented by the XR device.

In Example 2, the subject matter of Example 1 includes, wherein each of the plurality of machine learning models is uniquely associated with a respective hand gesture of a plurality of hand gestures, and the selection of the machine learning model based on the detected pose comprises: identifying, from among the plurality of hand gestures, a hand gesture corresponding to the detected pose; and selecting the machine learning model that is associated with the hand gesture.

In Example 3, the subject matter of Example 2 includes, wherein each of the plurality of machine learning models is trained to estimate illumination parameter values from images depicting the respective hand gesture associated with the machine learning model.

In Example 4, the subject matter of any of Examples 1-3 includes, performing, by the XR device, hand tracking to determine a position or zone of the hand within the real-world environment; and applying the estimated illumination parameter values as a local light probe associated with the position or zone of the hand within the real-world environment.

In Example 5, the subject matter of Example 4 includes, wherein the local light probe is stored to supplement at least one other set of illumination parameter values that is not specific to the hand.

In Example 6, the subject matter of any of Examples 1-5 includes, wherein the XR device is a head-mounted XR device, and the hand is a hand of a user of the XR device.

In Example 7, the subject matter of any of Examples 1-6 includes, wherein the estimated illumination parameter values include values indicative of incident illumination on the hand.

In Example 8, the subject matter of any of Examples 1-7 includes, wherein the estimated illumination parameter values include values for a set of spherical harmonics coefficients representing one or more of intensity or direction of light.

In Example 9, the subject matter of Examples 1-8 includes, wherein the using of the estimated illumination parameter values to render the virtual content comprises using the estimated illumination parameter values to generate an irradiance map.

In Example 10, the subject matter of any of Examples 1-9 includes, wherein the virtual content comprises a virtual object, and the rendering of the virtual object comprises: generating a three-dimensional model of the virtual object, the three-dimensional model having predetermined properties; and using the estimated illumination parameter values and the predetermined properties of the three-dimensional model to obtain rendering characteristics for the virtual object.

In Example 11, the subject matter of any of Examples 1-10 includes, wherein the image is captured by the image sensor and includes the hand and other features in the real-world environment, the method further comprising: performing segmentation to separate the hand from the other features, wherein the at least part of the image that is processed via the machine learning model includes the hand and excludes the other features.

In Example 12, the subject matter of any of Examples 1-11 includes, wherein model parameters of the machine learning model are stored locally on the XR device, and the processing of the at least part of the image via the machine learning model is performed at the XR device.

In Example 13, the subject matter of Examples 1-12 wherein the machine learning model comprises a CNN.

In Example 14, the subject matter of any of Examples 1-13 includes, causing presentation of the virtual content, via a display arrangement of the XR device, as overlaid on the real-world environment.

In Example 15, the subject matter of any of Examples 1-14 includes, wherein each of the plurality of machine learning models is trained on a respective training dataset comprising training images of hands in varying lighting conditions.

In Example 16, the subject matter of Example 15 includes, wherein each of the plurality of machine learning models is uniquely associated with a respective hand gesture of a plurality of hand gestures, and wherein the training dataset of each of the plurality of machine learning models comprises training images of hands depicting the respective hand gesture associated with the machine learning model.

In Example 17, the subject matter of any of Examples 15-16 includes, wherein each of the plurality of machine learning models is trained using supervised learning, and each respective training dataset further comprises, for each training image, corresponding illumination parameter values representing lighting conditions associated with a hand depicted in the training image.

In Example 18, the subject matter of any of Examples 15-17 includes, wherein at least a subset of the training images are synthetic images generated using a graphics engine that simulates the varying lighting conditions.

Example 19 is a system comprising: at least one processor; and at least one memory storing instructions that, when executed by the at least one processor, configure the system to perform operations comprising: obtaining, via an image sensor of an extended reality (XR) device, an image of a hand in a real-world environment; processing at least part of the image to detect a pose of the hand; selecting, based on the detected pose, a machine learning model from among a plurality of machine learning models; processing at least part of the image via the machine learning model to obtain estimated illumination parameter values associated with the hand; and using the estimated illumination parameter values to render virtual content to be presented by the XR device.

Example 20 is a non-transitory computer-readable storage medium, the computer-readable storage medium including instructions that when executed by at least one processor, cause the at least one processor to perform operations comprising: obtaining, via an image sensor of an extended reality (XR) device, an image of a hand in a real-world environment; processing at least part of the image to detect a pose of the hand; selecting, based on the detected pose, a machine learning model from among a plurality of machine learning models; processing at least part of the image via the machine learning model to obtain estimated illumination parameter values associated with the hand; and using the estimated illumination parameter values to render virtual content to be presented by the XR device.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Example 25 is an XR device comprising means to implement any of Examples 1-20.

What is claimed is:

1. A method comprising:
obtaining, via an image sensor of an extended reality (XR) device, an image of a hand in a real-world environment;
processing at least part of the image to detect a pose of the hand;
selecting, based on the detected pose, a machine learning model from among a plurality of machine learning models;
processing at least part of the image via the machine learning model to obtain estimated illumination parameter values associated with the hand;
performing, by the XR device, hand tracking to determine at least one of a position or a zone of the hand within the real-world environment;
applying the estimated illumination parameter values as a local light probe associated with the at least one of the position or the zone of the hand within the real-world environment; and
using the estimated illumination parameter values to render virtual content to be presented by the XR device.

2. The method of claim 1, wherein each of the plurality of machine learning models is uniquely associated with a respective hand gesture of a plurality of hand gestures, and the selection of the machine learning model based on the detected pose comprises:
identifying, from among the plurality of hand gestures, a hand gesture corresponding to the detected pose; and
selecting the machine learning model that is associated with the hand gesture.

3. The method of claim 2, wherein each of the plurality of machine learning models is trained to estimate illumination parameter values from images depicting the respective hand gesture associated with the machine learning model.

4. The method of claim 1, wherein the local light probe is stored to supplement at least one other set of illumination parameter values that is not specific to the hand.

5. The method of claim 1, wherein the XR device is a head-mounted XR device, and the hand is a hand of a user of the XR device.

6. The method of claim 1, wherein the estimated illumination parameter values include values indicative of incident illumination on the hand.

7. The method of claim 1, wherein the estimated illumination parameter values include values for a set of spherical harmonics coefficients representing one or more of intensity or direction of light.

8. The method of claim 1, wherein the using of the estimated illumination parameter values to render the virtual content comprises using the estimated illumination parameter values to generate an irradiance map.

9. The method of claim 1, wherein the virtual content comprises a virtual object, and the rendering of the virtual object comprises:
generating a three-dimensional model of the virtual object, the three-dimensional model having predetermined properties; and
using the estimated illumination parameter values and the predetermined properties of the three-dimensional model to obtain rendering characteristics for the virtual object.

10. The method of claim 1, wherein the image is captured by the image sensor and includes the hand and other features in the real-world environment, the method further comprising:
performing segmentation to separate the hand from the other features, wherein the at least part of the image that is processed via the machine learning model includes the hand and excludes the other features.

11. The method of claim 1, wherein model parameters of the machine learning model are stored locally on the XR device, and the processing of the at least part of the image via the machine learning model is performed at the XR device.

12. The method of claim 1, the machine learning model comprises a Convolutional Neural Network (CNN).

13. The method of claim 1, further comprising:
causing presentation of the virtual content, via a display arrangement of the XR device, as overlaid on the real-world environment.

14. The method of claim 1, wherein each of the plurality of machine learning models is trained on a respective training dataset comprising training images of hands in varying lighting conditions.

15. The method of claim 14, wherein each of the plurality of machine learning models is uniquely associated with a respective hand gesture of a plurality of hand gestures, and wherein the training dataset of each of the plurality of machine learning models comprises training images of hands depicting the respective hand gesture associated with the machine learning model.

16. The method of claim 14, wherein each of the plurality of machine learning models is trained using supervised learning, and each respective training dataset further comprises, for each training image, corresponding illumination parameter values representing lighting conditions associated with a hand depicted in the training image.

17. The method of claim 14, wherein at least a subset of the training images are synthetic images generated using a graphics engine that simulates the varying lighting conditions.

18. A system comprising:

at least one processor; and at least one memory storing instructions that, when executed by the at least one processor, configure the system to perform operations comprising:

obtaining, via an image sensor of an extended reality (XR) device, an image of a hand in a real-world environment;

processing at least part of the image to detect a pose of the hand;

selecting, based on the detected pose, a machine learning model from among a plurality of machine learning models;

processing at least part of the image via the machine learning model to obtain estimated illumination parameter values associated with the hand;

performing, by the XR device, hand tracking to determine at least one of a position or a zone of the hand within the real-world environment;

applying the estimated illumination parameter values as a local light probe associated with the at least one of the position or the zone of the hand within the real-world environment; and using the estimated illumination parameter values to render virtual content to be presented by the XR device.

19. A non-transitory computer-readable storage medium, the computer-readable storage medium including instructions that when executed by at least one processor, cause the at least one processor to perform operations comprising:

obtaining, via an image sensor of an extended reality (XR) device, an image of a hand in a real-world environment;

processing at least part of the image to detect a pose of the hand;

selecting, based on the detected pose, a machine learning model from among a plurality of machine learning models;

processing at least part of the image via the machine learning model to obtain estimated illumination parameter values associated with the hand;

performing, by the XR device, hand tracking to determine at least one of a position or a zone of the hand within the real-world environment;

applying the estimated illumination parameter values as a local light probe associated with the at least one of the position or the zone of the hand within the real-world environment; and using the estimated illumination parameter values to render virtual content to be presented by the XR device.

20. The system of claim 18, wherein the estimated illumination parameter values include values for a set of spherical harmonics coefficients representing one or more of intensity or direction of light.

* * * * *